US011404222B2

(12) United States Patent
Kim et al.

(10) Patent No.: US 11,404,222 B2
(45) Date of Patent: Aug. 2, 2022

(54) APPARATUS FOR GENERATING ELECTRICAL ENERGY BASED ON HYDROPHILIC FIBER MEMBRANE AND METHOD OF FABRICATING SAME

(71) Applicant: Korea Advanced Institute of Science and Technology, Daejeon (KR)

(72) Inventors: Il-Doo Kim, Daejeon (KR); Tae-Gwang Yun, Daejeon (KR); Jin Gook Bae, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 125 days.

(21) Appl. No.: 16/175,204

(22) Filed: Oct. 30, 2018

(65) Prior Publication Data
US 2019/0148085 A1 May 16, 2019

(30) Foreign Application Priority Data

Nov. 13, 2017 (KR) .................. 10-2017-0150695
Jul. 13, 2018 (KR) .................. 10-2018-0081431
(Continued)

(51) Int. Cl.
H02N 11/00 (2006.01)
H01G 11/52 (2013.01)
(Continued)

(52) U.S. Cl.
CPC ......... H01G 11/52 (2013.01); B01D 67/0046 (2013.01); B01D 67/0079 (2013.01);
(Continued)

(58) Field of Classification Search
CPC ........ H01G 11/48; H01G 11/32; H01G 11/30; B01D 67/0046; B01D 67/0079; B01D 69/02; H02N 11/002
See application file for complete search history.

(56) References Cited

U.S. PATENT DOCUMENTS

| 2008/0212261 A1* | 9/2008 | Ajayan | .................. H01G 11/56 361/502 |
| 2011/0097624 A1* | 4/2011 | Bhatt | ..................... H01G 9/042 429/163 |

(Continued)

FOREIGN PATENT DOCUMENTS

CN 104916448 A * 9/2015
KR 1020170093401 A 8/2017
(Continued)

OTHER PUBLICATIONS

Pushparaj et al., Flexible energy storage devices based on nanocomposite paper, PNAS Aug. 21, 2007 104 (34) 13574-13577; https://doi.org/10.1073/pnas.0706508104 (Year: 2007).*
Jost et al., Carbon coated textiles for flexible energy storage, Energy Environ. Sci., 2011, 4, 5060; DOI: 10.1039/c1ee02421c (Year: 2011).*
Pasta, M., La Mantia, F., Hu, L. et al. Aqueous supercapacitors on conductive cotton, Jun. 11, 20210, Nano Res. 3, 452-458 (Year: 2010).*
(Continued)

*Primary Examiner* — David M Sinclair
(74) *Attorney, Agent, or Firm* — Blank Rome LLP

(57) ABSTRACT

Disclosed herein is a complex generator including a hydrophilic fiber membrane coated with an adsorption material. Electrical energy is generated in such a manner that the adsorption material is adsorbed onto a polar solvent in some region of the hydrophilic fiber membrane by asymmetrical wetting of the polar solvent for the hydrophilic fiber membrane.

17 Claims, 30 Drawing Sheets

(30) Foreign Application Priority Data

| Jul. 13, 2018 | (KR) | 10-2018-0081432 |
| Oct. 15, 2018 | (KR) | 10-2018-0122573 |
| Oct. 15, 2018 | (KR) | 10-2018-0122649 |

(51) Int. Cl.

| H01G 11/04 | (2013.01) |
| H01G 11/84 | (2013.01) |
| H01G 11/56 | (2013.01) |
| H01G 11/60 | (2013.01) |
| B01D 67/00 | (2006.01) |
| B01D 71/02 | (2006.01) |
| B01D 69/02 | (2006.01) |
| B01D 69/06 | (2006.01) |
| B01D 71/72 | (2006.01) |
| B01D 71/82 | (2006.01) |
| B01D 71/28 | (2006.01) |
| B01D 69/10 | (2006.01) |

(52) U.S. Cl.
CPC .............. *B01D 69/02* (2013.01); *B01D 69/06* (2013.01); *B01D 69/10* (2013.01); *B01D 71/021* (2013.01); *B01D 71/28* (2013.01); *B01D 71/72* (2013.01); *B01D 71/82* (2013.01); *H01G 11/04* (2013.01); *H01G 11/56* (2013.01); *H01G 11/60* (2013.01); *H01G 11/84* (2013.01); *H02N 11/002* (2013.01); *B01D 2325/26* (2013.01); *Y02E 60/00* (2013.01)

(56) References Cited

U.S. PATENT DOCUMENTS

| 2011/0271424 A1* | 11/2011 | Revol Cavalier | H01M 6/04 2/243.1 |
| 2016/0258110 A1 | 9/2016 | Alamer | |
| 2020/0006783 A1* | 1/2020 | Sen | A41D 31/12 |

FOREIGN PATENT DOCUMENTS

| WO | WO2013/111970 A1 | 8/2013 |
| WO | WO2017/131377 A1 | 8/2017 |

OTHER PUBLICATIONS

Hu et al., Stretchable, Porous, and Conductive Energy Textiles, Jan. 5, 2010, Nano Lett. 2010, 10, 2, 708-714 (Year: 2010).*
Yin et al, Generating electricity by moving a droplet of ionic liquid along graphene, Apr. 6, 2014, Nature Nanotech 9, 378-383, https://doi.org/10.1038/nnano.2014.56 (Year: 2014).*
Xue et al., "Water-evaporation-induced electricity with nanostructured carbon materials", Nature Nanotechnology, 2017, pp. 1-6.
Ding et al., "All-Printed Porous Carbon Film for Electricity Generation from Evaporation-Driven Water Flow", Adv. Funct. Mater. 2017, 27, pp. 1-5.
European Search Report of European Patent Application No. 18203715.0 dated Apr. 16, 2019.
Jiangli Xue et al., "Vapor-Activated Power Generation on Conductive Polymer", Advanced Functional Materials, 2016, vol. 27, Issue 47, pp. 8784-8792.

* cited by examiner

Cotton fabric coated with Ketjen black

Korean mulberry paper coated with Ketjen black

Polypropylene membrane coated with Ketjen black

Glass substrate coated with Ketjen black

Stacked energy generation apparatus
(2102)
(2101)
Support
(2103)
Large-area energy generation apparatus

APPARATUS FOR GENERATING ELECTRICAL ENERGY BASED ON HYDROPHILIC FIBER MEMBRANE AND METHOD OF FABRICATING SAME

CROSS REFERENCE TO RELATED APPLICATION

The present application claims the benefit of Korean Patent Application No. 10-2017-0150695 filed in the Korean intellectual Property Office on Nov. 13, 2017, Korean Patent Application No. 10-2018-0081431 filed in the Korean Intellectual Property Office on Jul. 13, 2018, Korean Patent Application No. 10-2018-0081432 filed in the Korean Intellectual Property Office on Jul. 13, 2018, Korean Patent Application No. 10-2018-0122573 filed in the Korean Intellectual Property Office on Oct. 15, 2018, and Korean Patent Application No. 10-2018-0122649 filed in the Korean Intellectual. Property Office on Oct. 15, 2018, the entire contents of which are incorporated herein by reference.

BACKGROUND OF THE INVENTION

1. Technical Field

The present invention relates to a new concept electrical energy generation apparatus and a method of fabricating the same, wherein continuous electrical energy is generated based on an open-circuit voltage and short-circuit current formed because a wetted region and a dry region are asymmetrically maintained by dropping a small amount of a polar solvent to only a region connected to one of two electrodes connected to a hydrophilic fiber membrane coated with a carbon layer using a double layer formed in a process of the polar solvent to be adsorbed onto a surface of carbon. Specifically, the electrical energy generation apparatus based on a hydrophilic fiber membrane coated with a carbon layer forms the carbon layer by uniformly coating carbon particles on a surface of the fiber strands of the hydrophilic fiber membrane through a dipping process. When the polar solvent drops to one electrode connected to the hydrophilic fiber membrane coated with carbon particles, the physical adsorption of ions is performed on a surface of the carbon layer in order to reduce surface energy. Accordingly, the electric double layer is formed, and a potential difference induced by a capacitance difference is formed between the wetted region and the dry region. The potential formed by the capacitance difference remains intact until the polar solvent is fully evaporated. Furthermore, a high polar solvent adsorption force of the hydrophilic fabric fiber strand moves hydrogen ions (proton), included in the polar solvent, from the wetted region to the dry region, and electrons within carbon also move in the same direction in order to maintain charge neutrality. Accordingly, a current continues to flow until the polar solvent is fully evaporated. In particular, the present invention relates to a carbon layer-hydrophilic fiber complex generator for generating electrical energy for 1 hour or more until water is evaporated because an asymmetrical electric double layer is generated by dropping a small amount (0.25 ml) of water on a surface of the electrical energy generation apparatus based on a hydrophilic fiber membrane coated with a carbon layer and a method of fabricating the same.

Furthermore, the present invention relates to an electrical energy generation apparatus for conversion into electrical energy of high performance using unique high voltage generation efficiency formed in a process of adsorption on a surface of conductive polymers, that is, a pseudocapacitor material to a surface of which both anions and cations can adhere by the asymmetrical wetting of a polar solvent (preferably, polar protic solvent containing ions) and a flow of a fluid, a method of fabricating the electrical energy generation apparatus, and a large-area electrical energy generation apparatus in which a plurality of the electrical energy generation apparatuses has been coupled. Specifically, each electrical energy generation apparatus based on a hydrophilic fiber membrane coated with a conductive polymer uniformly coats a uniform conductive polymer layer on a surface of the fiber strands of the hydrophilic fiber membrane through a dipping process using a conductive polymer solution dispersed in water. When a polar solvent drops to the hydrophilic fiber membrane coated with the conductive polymer, a potential caused by a capacitance difference attributable to an electric double layer generated by physical adsorption for lowering surface energy is formed between a wetted region and a dry region. The potential induced by the capacitance difference can be maintained in the long term until the polar solvent is fully evaporated. Furthermore, the high polar solvent adsorption force of the hydrophilic fabric fiber strand moves hydrogen ions (proton), included in the polar solvent, from the wetted region to the dry region, and causes a flow of electrons of the conductive polymer for maintaining charge neutrality, thereby being capable of generating power.

2. Description of the Related Art

An electrical energy generation apparatus provides electrical energy that never has environmental pollution and is harmless to the human body and sustainable for a long time using eco-friendly rich materials existing in nature, such as water, air and the sun always present in our life, or naturally obtained energy. Energy obtained like this improves the quality of life by being combined with a sensor network and an electronic device based on a wireless data transmission and reception technology.

In electrical energy generation apparatuses developed so far, piezoelectric in which a potential occurs due to structure deformation attributable to mechanical pressure, triboelectric in which a potential occurs due to static electrification generated by mechanical friction, thermoelectric in which a potential occurs by a flow of heat, etc. are used as representative electrical energy generation apparatuses. Each of the electrical energy generation apparatuses has an advantage in that it generates a high voltage and high power of several tens of µW~mW. In particular, the piezoelectric or triboelectric energy generation apparatus can convert a movement of the human body into electrical energy and are used as a wearable electrical energy generation apparatus.

However, the developed electrical energy generation apparatus has some clear disadvantages. First, electrical energy is generated in the form of a high frequency AC voltage and current according to the energy generation principle. In the case of the piezoelectric or triboelectric energy generation apparatus that generates electrical energy through mechanical deformation and friction, an instant voltage difference is formed only when mechanical deformation and friction are applied. When the applied mechanical action is removed, a voltage difference occurs again in the opposite direction. For this reason, electrical energy has an AC form having a large number of vibrations. AC electrical energy of a high frequency generated as described above cannot be directly connected to an electronic device to drive the electronic device. For this reason, the piezoelectric or triboelectric energy generation apparatus has a disadvantage in that generated energy can be used only when a separate rectifier circuit and energy storage device are always involved.

Another problem is that generation efficiency of the electrical energy generation apparatus continues to decrease because repetitive mechanical deformation, friction and a thermal flow damage a device. The reason for this is that the continuous mechanical deformation, friction and thermal flow inevitably damages or deforms the core material and substance of the electrical energy generation apparatus. Moreover, in general, a material used for the electrical energy generation apparatus is based on a material not having electrical conductivity. Accordingly, a collector (metal substrate) providing electrical conductivity has been attached, to most of the electrical energy generation apparatuses. The deformation of a device attributable to mechanical deformation, friction and/or a thermal flow is a main cause that an energy generation material is delaminated from a current collector, so energy generation efficiency is deteriorated and device reliability is decreased.

A generator design and the development of a fabrication technology capable of continuously generating voltage difference without damage to an energy generation apparatus must be previously performed in order to develop a high efficiency electrical energy generation apparatus having high reliability. Furthermore, if an electrical energy generation apparatus that generates electrical energy in the form of DC not AC, power can be directly supplied to an electronic device without an additional circuit or a separate circuit. In this case, the electrical energy generation apparatus can be simplified, a production cost can be reduced, and usability can be improved.

SUMMARY OF THE INVENTION

An object of the present invention is to provide an apparatus for continuously generating DC energy by the asymmetrical wetting of a polar solvent with respect to a hydrophilic membrane coated with conductive carbon particles and a method of fabricating the same. The polar solvent adhered to a surface of carbon generates capacitance/potential by forming an electric double layer. A hydrophilic fiber moves a fluid (water molecules and hydrogen ions) from a wetted region to a dry region based on an excellent polar solvent, adsorption force, and also generates electron transfer in order to maintain charge neutrality. Accordingly, there provided a sustainable electrical energy generation apparatus capable of generating electrical energy of a DC form by forming a potential and transferring electrons and supplying power to an electronic device or the energy in a secondary cell or supercapacitor.

Another object of the present invention is to provide a method of fabricating an electrical energy generation apparatus facilitating mass production and large area fabrication, which can generate energy by the presence of a simple polar solvent only because a carbon layer is uniformly coated on a surface of fiber strands of a hydrophilic fiber membrane capable of easily adsorbing the polar solvent through a dipping process.

Another object of the present invention is to provide an electrical energy generation apparatus capable of directly driving an electronic device using a small amount of a polar solvent and an electrical energy generation apparatus based on a hydrophilic fiber membrane coated with a carbon layer by increasing a surface area on which the carbon layer may be coated using the fiber membrane, and a method of fabricating the same.

Furthermore, when the polar solvent drops to the hydrophilic fiber membrane coated with conductive polymers cations and anions included in the polar solvent are adsorbed onto a surface of conductive polymer layer, that is, a pseudocapacitor material that may be physically adsorbed, in order to lower surface energy, and thus form an electric double layer. Accordingly, a potential attributable to a capacitance difference occurs between a wetted region and a dry region. The potential formed by the capacitance difference is maintained in the long term until the polar solvent is fully evaporated. Furthermore, the high polar solvent adsorption force of a hydrophilic fabric fiber strand rapidly moves hydrogen ions (proton), included in the polar solvent, from the wetted region to the dry region. Electrons within the conductive polymers also move in the same direction in order to maintain charge neutrality. Accordingly, a current continues to flow until the polar solvent is fully evaporated. Embodiments of the present invention provide a high performance electrical energy generation apparatus for generating electrical energy having a high voltage and current of a DC form and a method of fabricating the electrical energy generation apparatus.

Furthermore, there is provided a large-area electrical energy generation apparatus in which a plurality of electrical energy generation apparatuses has been combined so that it can be used in various conditions and environments, such as that supplying power to an IoT electronic device and storing generated energy in a secondary cell or a supercapacitor.

In a carbon layer-hydrophilic fiber complex generator and a method of fabricating the same according to an aspect of the present invention, there is provided an electrical energy generation apparatus (carbon layer-hydrophilic fiber complex generator) capable of producing DC electrical energy through a process of drying a hydrophilic fiber membrane coated with a carbon layer in an oven of 80° C. is fabricated by forming a solution in which carbon particles, that is, an example of the carbon layer, have been dispersed, cutting the hydrophilic fiber membrane in a given size, uniformly coating the cut hydrophilic fiber membrane with the carbon layer consisting of carbon particles by dipping it into the carbon coating solution in which the carbon particles have been dispersed. Furthermore, there is provided a method of fabricating a hydrophilic fiber membrane complex generator in which a carbon layer having the asymmetrical wetting structure of a polar solvent capable of forming a DC voltage and current has been attached to a surface of each fiber by connecting complex generators in a stacking, in series and/or in parallel.

A method of fabricating an electrical energy generation apparatus based on a carbon layer coated with a hydrophilic fiber membrane and an electric double layer formed by a polar solvent according to an embodiment of the present invention includes the steps of (a) fabricating a carbon coating solution forming a carbon layer, (b) cutting a hydrophilic membrane in a designed size, (c) coating the surface of each fiber forming the hydrophilic fiber membrane with the carbon layer by dipping the hydrophilic fiber membrane into the carbon coating solution, (d) drying the hydrophilic membrane coated with the carbon layer in an oven, (e) fabricating a stack type generator by stacking two or more hydrophilic fiber membrane generators coated with the carbon layer, and (f) forming a DC voltage and current by connecting the stacked membrane generators in series and in parallel and asymmetrically dropping a polar solvent.

The step (a) is the step of fabricating the carbon coating solution to be used in a dipping process by dipping carbon particles into the polar solvent. Specifically, the carbon particles may be one selected from activated carbon, super-P, acetylene black, and Ketjen black. The carbon layer may further include one kind of graphene and carbon nanotube or a mixture of two or more of them. There is no limit to a specific material if it is a carbon material having excellent electrical conductivity and well adhering to the hydrophilic fiber membrane. 0-dimensional (D) carbon particles, 1-D nanotube, 2-D graphene or graphene oxide may be solely used or they may be combined and used. One kind of deionized water, acetonitrile, methanol, isopropanol, ethanol, dimethylformamide (DMF), acetone, ethylene glycol (EG), dimethyl sulfoxide (DMSO), ammonia and pyridine or a mixed solvent of two or more kinds of them may be selected as a solvent used in the process of dispersing the carbon particles. Water that has high polarity and a great dielectric constant and that may be easily used may be preferably used as the solvent. A concentration condition of the solution used in the dipping process includes a solution of a concentration range of 0.1-50 wt % (preferably, 0.1~10 wt %) capable of uniform coating. In order to fabricate a carbon solution to be used in the dipping process and having a high degree of dispersion, a surfactant is added to the solution in which carbon particles have been dispersed. The carbon particles are uniformly dispersed by performing sonication on the carbon particle-dispersed solution to which the surfactant has been added. One kind of anion series, cation series and nonpolar surfactants or a mixed surfactant of two or more kinds of them is used as the surfactant. The surfactant is added based on a mass ratio within a range of 10:1~1:100 with respect to nano particles having surface charges. The surfactant may include at least one of sodium dodecylbenzenesulfonate (SDBS), Span 20, Span 60, Span 65, Span 80, Tween 20, Tween 40, Tween 60, Tween 65, Tween 80 and Tween 85. The amount of the surfactant may be included in the range of water versus 0.1~20 wt %.

The step (b) includes adjusting the standard of the electricity generation apparatus by cutting the hydrophilic fiber membrane in a given size. Cotton and paper having a high water adsorption force may be used as the material of the hydrophilic fiber membrane. The hydrophilic fiber membrane may have fiber strands in order to achieve high specific surface area. A porous membrane having a diameter of 50 nm~500 μm is used as the fiber strand forming the hydrophilic fiber membrane. The standard of the hydrophilic fiber membrane to be applied to the electrical energy generation apparatus includes cutting the hydrophilic fiber membrane in the size range of a aspect ratio 1 or more to 100 or less in order to effectively absorb water and maintain asymmetrical wetting. In this case, the thickness of the hydrophilic fiber membrane is 10 μm~1 mm.

The step (c) is the step of dipping the hydrophilic fiber membrane into the solution in which the carbon particles have been dispersed. The carbon particles may be uniformly coated on a surface of the hydrophilic fiber membrane by adjusting the number of times of dipping. A hydrophilic fiber membrane coated with a carbon layer is fabricated by dipping the hydrophilic fiber membrane, cut in a given size, into the carbon coating solution fabricated in the step (a). The loading amount of the carbon particles coated on the hydrophilic fiber membrane can be easily adjusted by controlling the number of times of dipping during the dipping process. Accordingly, resistance of the carbon layer forming the electrical energy generation apparatus can be controlled. The resistance of the carbon layer may be selected in the range of 100 Ω~100 MΩ because it has a great influence on a flow of current in addition to a voltage.

In the dry process in the step (d), after the hydrophilic fiber membrane dipped in the coating solution is flatly placed on a tray, the hydrophilic fiber membrane generator coated with the carbon layer is fabricated by drying the hydrophilic fiber membrane in the oven of 80° C.

The step (e) is the step of stacking two or more hydrophilic fiber membrane generators coated with the carbon layer. The hydrophilic fiber membrane generators coated with the carbon layer and stacked to have continued long wetting are fabricated by widening the electric double layer forming area between the polar solvent and carbon particles within the stacked membranes and efficiently blocking the evaporation of the polar solvent (representatively water). An electricity generation time can be further increased because the polar solvent is effectively confined between the hydrophilic fiber membranes by the stacking of the hydrophilic fiber membranes.

In the step (f), a circuit is configured by connecting a plurality of the stacked hydrophilic fiber membrane generators coated with the carbon layer in series and in parallel and connecting two electrodes by partially dropping water to only one of the two electrodes connected to the hydrophilic fiber membrane electrical energy generation apparatus coated with the carbon layer so that a wetted region and a dry region are divided. A surface of the carbon layer has negative charges to form a negative potential because an electric double layer is formed on a surface of the carbon particles in the wetted region. For this reason, a clear potential is formed between the electrode wetted by water and the dry region. Furthermore, the high polar solvent adsorption force of the hydrophilic fiber membrane moves a large amount of cations (e.g., hydrogen ions) from the wetted region to the dry region. Electrons within the carbon move in the same direction as the moving direction of the cations in order to maintain charge neutrality, thus forming a DC current. Holes may move in the opposite direction to the movement of the hydrogen ions, thus forming a DC current. At this time, when the two electrodes are connected by the circuit, a DC voltage, a DC current, power is generated. If a too large amount of water is dropped and thus water fully comes into contact with the two electrodes of the hydrophilic fiber membrane coated with a carbon layer, a potential may be lost. Accordingly, a proper amount of the polar solvent must be applied to the hydrophilic fiber membrane coated with a carbon layer, having a given size. For example, in the case of a hydrophilic fiber membrane coated with a carbon layer, having a 3 cm (length)×9 cm (breadth) size of an aspect ratio 3, when water of 0.5 ml drops to the left side or right side of the carbon layer-hydrophilic fiber complex generator once, DC power can be produced statically. It is preferred to sufficiently soak the hydrophilic fiber membrane with water because energy is continuously generated until water is fully evaporated.

Pseudocapacitor materials that may adhere to a surface of the anions and the cations have high adsorption efficiency compared to an electric double layer material, such as the existing carbon series. In particular, conductive polymer series, that is, a representative pseudocapacitor material, enables the rapid movement of electrons in electrical conductivity. In a hydrophilic membrane coated with conductive polymers, an electric double layer is formed by cations and anions adhered to a surface of the conductive polymers, so a voltage difference attributable to a capacitance difference is induced between the wetted region and the dry region. Accordingly, there is provided an electrical energy generation apparatus for generating electrical energy of a DC form using a flow of electrons caused by a movement of hydrogen ions occurring due to the high polar solvent adsorption force of the hydrophilic membrane.

In accordance with an aspect, electrical energy may be continuously generated by a potential attributable to a capacitance difference formed cations and anions to which polymers adhere and a flow of electrons caused by a movement of hydrogen ions attributable to a flow of a fluid occurring due to the high polar solvent adsorption force of the hydrophilic membrane.

In accordance with another aspect, a current may be continuously generated because cations and anions within the polar solvent of the wetted region of the hydrophilic fiber membrane move toward the dry region of the hydrophilic fiber membrane according to a movement attributable to the adsorption of the polar solvent to the hydrophilic fiber membrane of the polar solvent.

In accordance with yet another aspect, the polar solvent may include polar protic solvent containing ions, and cations and anions included in a polar protic solvent may be additionally arranged on the outer Helmholtz plane of the wetted region.

In accordance with yet another aspect, the electrical energy generation apparatus may further include a first electrode connected to the wetted region of a hydrophilic fiber membrane and a second electrode connected to the dry region of the hydrophilic fiber membrane.

In accordance with yet another aspect, the polar solvent may include (1) a synthetic solution in which ions have been dissolved in at least one polar protic solvent of formic acid, n-butanol, isopropanol, n-propanol, ethanol, methanol and water and (2) a solution existing in nature, such as at least one of seawater and sweat.

In accordance with yet another aspect, the conductive polymer material forming the conductive polymer layer may include at least one conductive polymer material selected from poly(3,4-ethylenedioxythiophene) (PEDOT:PSS), polyaniline (PANI), polypyrrole (PPy), Poly(p-phenylene vinylene) (PPV), Poly(acetylene)s (PAC), and poly(p-phenylene sulfide) (PPS).

In accordance with yet another aspect, in the conductive polymer layer, the selected at least one conductive polymer material may have been composited in a 0-D, 1-D or 2-D manner in order to use an electrical conductivity characteristic and a pseudocapacitor characteristic capable of adsorbing cations and anions.

In accordance with yet another aspect, the conductive polymer layer may be coated by loading conductive polymers within a range of 2.1 mg/cm$^3$~0.024 mg/cm$^3$ per unit volume on the hydrophilic fiber membrane. The voltage and current of the generated electrical energy may be controlled by the amount of the loaded conductive polymers.

In accordance with yet another aspect, the hydrophilic fiber membrane may include at least one material selected from cotton fabric, Korean mulberry paper, a polypropylene membrane, oxygen plasma-processed non-woven fabric, hydrophilic surface-processed textile, and a nano fiber.

In accordance with yet another aspect, the hydrophilic fiber membrane may include a hydrophilic fiber strand in order to improve an adsorption force for a specific surface area and a polar protic solvent, and the conductive polymers may have adhered to the surface of each fiber.

In accordance With yet another aspect, the diameter of a hydrophilic fiber strand included in the hydrophilic fiber membrane may be included in the range of several tens of nm to several hundreds of μm.

In accordance with yet another aspect, the thickness of a hydrophilic fiber membrane may be included in the range of 5 μm to 1 mm.

In accordance with yet another aspect, in the hydrophilic fiber membrane, the aspect ratio in breadth and length may be 3 or more in order to maintain a voltage difference through the asymmetrical wetting of both polarities.

In accordance with yet another aspect, at least one of the amount, voltage and power density of electrical energy and an adsorption force for a polar protic solvent is controlled by stacking at least one hydrophilic fiber membrane on which a conductive polymer layer has been coated on the hydrophilic fiber membrane or connecting it in parallel or in series.

A method of fabricating an electrical energy generation apparatus includes the steps of (a) cutting a hydrophilic fiber membrane in a designed size; (b) coating a conductive polymer layer on the surface of each fiber forming the hydrophilic fiber membrane by dipping the hydrophilic fiber membrane into a conductive polymer coating solution; and (c) drying the hydrophilic fiber membrane coated with the conductive polymer layer. In this case, a wetted region and a dry region form opposite polarities because a polar solvent adheres to the conductive polymers of the wetted region by asymmetrical wetting attributable to the polar solvent on a surface of the conductive polymer layer, thereby generating electrical energy.

In accordance with an aspect, the method of fabricating an electrical energy generation apparatus may further include the step (d) of stacking two or more hydrophilic fiber membranes coated with the conductive polymer layer.

In accordance with another aspect, the method of fabricating an electrical energy generation apparatus may further include the step (e) of connecting a plurality of the hydrophilic fiber membranes coated with the conductive polymer layer in parallel or in series.

In accordance with yet another aspect, in the step (b), the conductive polymer coating solution may be generated by dispersing at least one conductive polymer material selected from poly(3,4-ethylenedioxythiophene) (PEDOT:PSS), polyaniline (PANI), polypyrrole (PPy), Poly(p-phenylene vinylene) (PPV), Poly(acetylene)s (PAC) and poly(p-phenylene sulfide) (PPS), that is, a conductive polymer material capable of adsorbing both cations and anions, into water so that the conductive polymer material has a mass ratio of 1 wt %.

In accordance with yet another aspect, the step (b) may include adjusting the amount of loaded conductive polymers by controlling the number of times that the hydrophilic fiber membrane is impregnated into the conductive polymer coating solution.

In accordance with yet another aspect, the step (c) may include flatly positioning the hydrophilic fiber membrane coated with the conductive polymer layer on a tray and drying it in an oven.

In accordance with yet another aspect, a circuit may be configured by partially dropping a polar solvent to only a portion connected to one of two electrodes connected to the hydrophilic fiber membrane coated with the conductive polymer layer so that the electrode of the wetted region and the electrode of the dry region are connected by the polar solvent, thereby generating DC power.

In accordance with yet another aspect, the polar solvent is a polar protic solvent including ions, and may include (1) a synthetic solution in which ions have been dissolved in a polar protic solvent selected from formic acid, n-butanol, isopropanol, n-propanol, ethanol, methanol and water or (2) a solution existing in nature, such seawater or sweat.

BRIEF DESCRIPTION OF THE DRAWINGS

The accompanying drawings included as part of the detailed description in order to help understanding of the present invention provide embodiments of the present invention, and describe the technical spirit of the present invention along with the detailed description.

DETAILED DESCRIPTION

Figure 1:
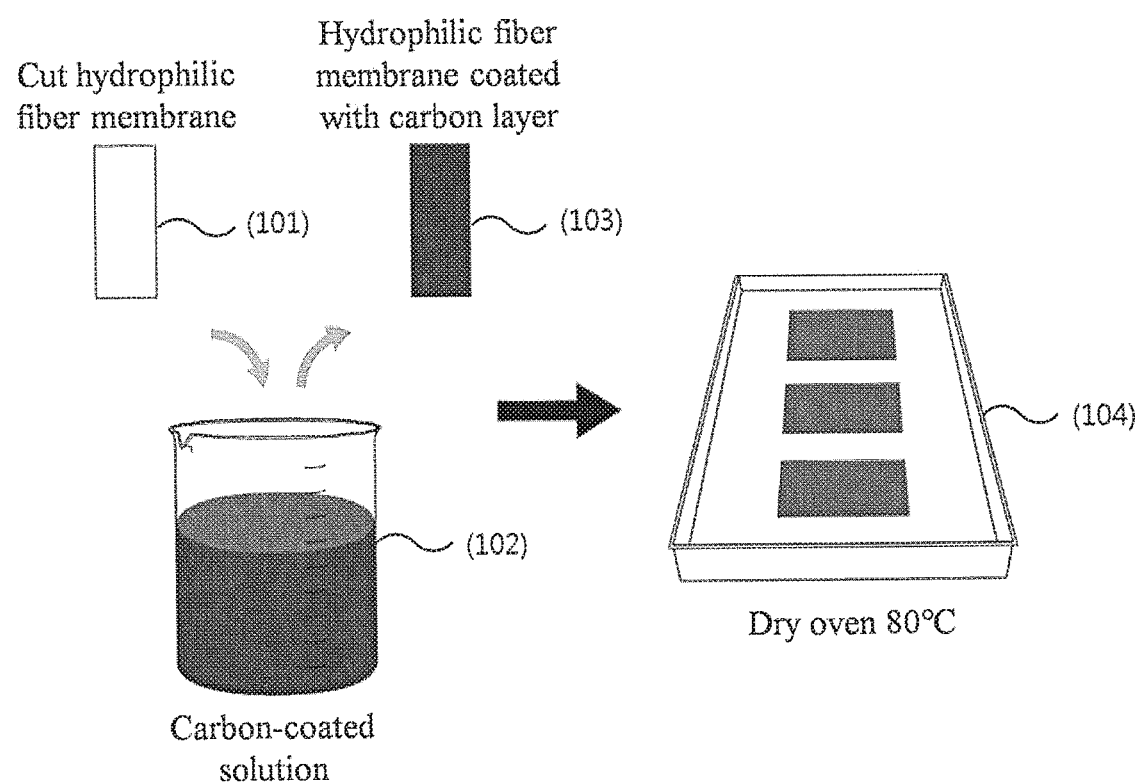
FIG. 1 is a fabrication diagram of an electrical energy generation apparatus based on a hydrophilic fiber membrane coated with a carbon layer, which is a fabrication process of the present invention.

The present embodiments may be modified various ways and may have various embodiments. Specific embodiments are to be illustrated in the drawings and to be described the detailed description.

In describing the present invention, a detailed description of the known technologies will be omitted if it is deemed to make the gist unnecessarily vague.

Hereinafter, an apparatus for generating electrical energy based on a hydrophilic fiber membrane coated with a carbon layer and a method of fabricating the same are described in detail with reference to the accompanying drawings.

The present invention relates to a new concept electrical energy generation apparatus and a method of fabricating the same, wherein continuous electrical energy is generated based on an open-circuit voltage and short-circuit current formed because a wetted region and a dry region are asymmetrically maintained by dropping a small amount of a polar solvent to only a region connected to one of two electrodes connected to a hydrophilic fiber membrane coated with a carbon layer using a double layer formed in a process of the polar solvent to be adsorbed onto a surface of carbon. Specifically, the electrical energy generation apparatus based on a hydrophilic fiber membrane coated with a carbon layer forms the carbon layer by uniformly coating carbon particles on a surface of the fiber strands of the hydrophilic fiber membrane through a dipping process. When the polar solvent drops to one electrode connected to the hydrophilic fiber membrane coated with carbon particles, the physical adsorption of ions is performed on a surface of the carbon layer in order to reduce surface energy. Accordingly, the electric double layer is formed, and a potential difference induced by a capacitance difference is formed between the wetted region and the dry region. The potential formed by the capacitance difference remains intact until the polar solvent is fully evaporated. Furthermore, a high polar solvent adsorption force of the hydrophilic fabric fiber strand moves hydrogen ions (proton), included in the polar solvent, from the wetted region to the dry region, and electrons within carbon also move in the same direction in order to maintain charge neutrality. Accordingly, a current continues to flow until the polar solvent is fully evaporated.

The electrical energy generation apparatus developed so far generates electrical energy in the form of a high frequency AC voltage and current. The reason for this is that a piezoelectric device or triboelectric energy generation apparatus that generates electrical energy by mechanical deformation and friction instantly forms a voltage difference only when deformation or friction is applied thereto and when the applied mechanical action is removed, a voltage difference having an opposite sign is formed again. Such an energy generation apparatus that generates high frequency AC power has a problem in that it can drive an electronic device only when it involves a separate rectifier circuit or energy storage device. In order to solve this problem, there is a need for an electrical energy generation apparatus capable of generating DC power which can be directly connected to an electronic device.

Furthermore, continuous mechanical deformation, friction or heating damages a device, and deteriorates energy generation efficiency of an electrical energy generation apparatus. Furthermore, mechanical deformation, friction and thermal flows cause to detach an energy generation material from a collector substrate. Accordingly, there is a problem in that energy generation efficiency is lowered. If an action to generate a voltage difference is sustainable and an energy storage device is not damaged although it is repetitively used, a high-reliability electrical energy generation apparatus capable of generating electrical energy for a long time can be implemented. In order to implement the electrical energy generation apparatus, there is a need for a new concept electrical energy generation apparatus capable of generating a potential difference by only a static action on which a dynamic force does not act.

In order to solve this problem, the present invention provides an electrical energy generation apparatus for generating DC power using a current continuously generated by hydrogen ions that are moved by a potential induced by a capacitance difference in a wetted region and dry region due to a double layer formed between a carbon surface and a polar solvent and the high polar solvent adsorption force of a hydrophilic fiber, and a method of fabricating the same. The present invention can greatly improve energy generation efficiency by coating one of a carbon layer (super-P), carbon particles selected from Denka black, acetylene black and Ketjen black, activated carbon, graphene, and carbon nanotubes having a wide surface area or two or more kinds of carbon of them on a hydrophilic fiber membrane having a wide specific surface area, and can produce electrical energy of a DC form because it uses an electric double layer formed because a polar solvent adheres to the carbon layer. Electrical energy of a DC form generated by the electrical energy generation apparatus can be directly connected to an electronic device without a separate rectifier circuit, and can drive the electronic device. In the present invention, a hydrophilic fiber membrane coated with a conductive adsorption material, such as a carbon layer, can be mass-produced at a low cost through a simple dipping process. The present invention has advantages in that a large area can be easily fabricated and the capacity of a generator can be easily increased by stacking a plurality of membranes.

FIG. 1 is a fabrication process diagram of an electrical energy generation apparatus (carbon layer-hydrophilic fiber membrane complex generator) based on a hydrophilic fiber membrane coated with a carbon layer according to an embodiment of the present invention. A hydrophilic fiber membrane 101 cut in a given standard is dipped into a carbon coating solution 102 in which carbon particles have been dispersed. The amount and uniformity of the carbon particles coated on a surface of the hydrophilic fiber membrane may be controlled by adjusting the number of times of dipping during the dipping process. A dipped hydrophilic fiber membrane 103 coated with a carbon layer is completed through a dry process 104 in a dry oven. Resistance of the hydrophilic fiber membrane electrical energy generation apparatus after the dry may have a range of 100 Ω~100 MΩ, and is advantageous to have a range of 10 kΩ~20 MΩ in order to achieve a high voltage and a current characteristic. FIG. 1 shows an example of a carbon layer including carbon particles. The carbon particle may be one selected from activated carbon, super-P, acetylene black, and Ketjen black. The carbon layer may further include one kind of graphene and carbon nanotube or a mixture of two or more of them. There is no limit to a specific material if a carbon material has excellent electrical conductivity and well adheres to the hydrophilic fiber membrane. 0-D carbon particles, 1-D nanotube, 2-D graphene or graphene oxide may be solely used or they may be composed and used. In the carbon layer-hydrophilic fiber membrane complex generator, carbon particles having a high specific surface area may be coated on a carbon material coated on each fiber forming a hydrophilic fiber. In this case, a fabricating process is the most simple. In the carbon layer, carbon may be loaded onto the hydrophilic fiber membrane in the range of 0.9 mg/cm³~0.007 mg per unit volume. Resistance of the hydrophilic fiber membrane may be changed by adjusting the amount of carbon, thereby being capable of controlling generated power through control of a current.

Figure 2:
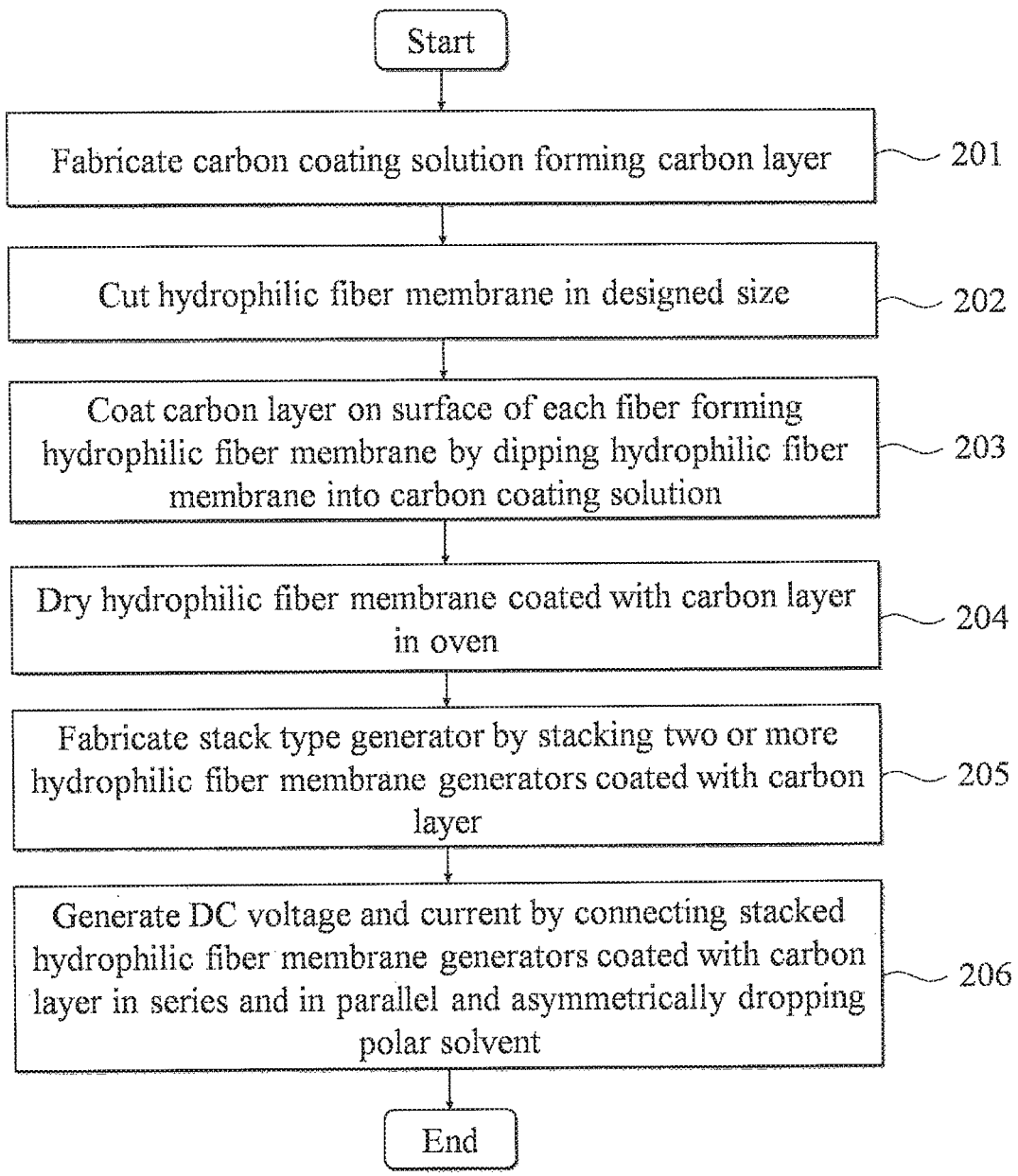
FIG. 2 is a flowchart illustrating a method of fabricating the electrical energy generation apparatus based on a hydrophilic fiber coated with a carbon layer using a dipping process according to an embodiment of the present invention.

FIG. 2 is a flowchart showing a method of fabricating an electrical energy generation apparatus based on a coated hydrophilic fiber membrane in which carbon particles form a carbon layer using a dipping process according to an embodiment of the present invention. As may be seen from the flowchart of FIG. 2, the method includes step 201 of fabricating a carbon coating solution having a high degree of dispersion through sonication by adding carbon particles to a water solvent along with a surfactant, step 202 of cutting a hydrophilic fiber membrane in a designed size, step 203 of coating a carbon layer on the surface of each fiber forming the hydrophilic fiber membrane by dipping the hydrophilic fiber membrane into the carbon coating solution, step 204 of flatly positioning the coated hydrophilic fiber membrane on a tray and drying the hydrophilic fiber membrane coated with the carbon layer in an oven, step 205 of fabricating a stack type generator by stacking two or more hydrophilic fiber membrane generators coated with the carbon layer, and step 206 of generating a DC voltage and current by connecting the stacked hydrophilic fiber membrane generators coated with the carbon layer in series and in parallel and asymmetrically dropping a polar solvent.

The fabricated electrical energy generation apparatus can be used as a home energy assistant device, a portable power assistant device or the assistant power device of a wearable electronic device because it can generate DC power for a long time with a small amount of water and can be mass-produced.

Hereinafter, embodiments of the present invention are described in detail. The embodiments have been provided to merely describe the present invention, and the present invention is not limited to the following examples.

Embodiment 1: Fabrication of Electrical Energy Generation Apparatuses Based on Cotton Fabric, Korean Mulberry Paper and Polypropylene Membrane Coated With Ketjen Black Using Dipping Process In order to fabricate a Ketjen black coating solution, Ketjen black 0.2 g and a surfactant (sodium dodecylbenzenesulfonate (SDBS)) 0.05 g were mixed with deionized water of 20 ml. A solution in which Ketjen black was dispersed was fabricated by uniformly mixing and dispersing the mixed Ketjen black solution through an ultrasonication process. For example, cotton fabric, Korean mulberry paper, a polypropylene membrane, oxygen plasma-processed non-woven fabric, hydrophilic surface-processed textile or a nanofiber may be selected as the hydrophilic fiber membrane. In the present embodiment, the hydrophilic fiber membrane was cut based on an aspect ratio 3 according to the standard of 3 cm (length)×9 cm (breadth). Each of the cut membranes was dipped into the solution in which the carbon particles were dispersed once. The cotton membrane coated with the dipped Ketjen black was placed on a flat tray. Finally, a carbon layer-fiber membrane complex electrical energy generation apparatus in which Ketjen black particles were coated on the surface of each fiber forming each membrane was fabricated through a dry process in a dry oven of 80° C. In order to evaluate power generated from the complex electrical energy generation apparatus, an open-circuit voltage and a short-circuit voltage were measured by adjusting the variable of a solution-humidity. In the measuring method, after a (lithium, sodium, potassium) solution including a very small amount of water of 0.15 ml~0.5 ml or univalence cations having various radii dropped to one electrode of the carbon layer-fiber membrane generator, open-circuit voltage and short-circuit current characteristics were measured. The added univalence cations may have a great influence on a generated voltage and current because they change the concentration and charges of an outer Helmholtz layer formed between a carbon surface and the solution. Furthermore, in order to check the correlation between the generated power and humidity, the open-circuit voltage and the short-circuit current were measured in relative humidity environments of 25%, 50% and 85% within an acrylic box where relative humidity could be maintained.

Figure 3:
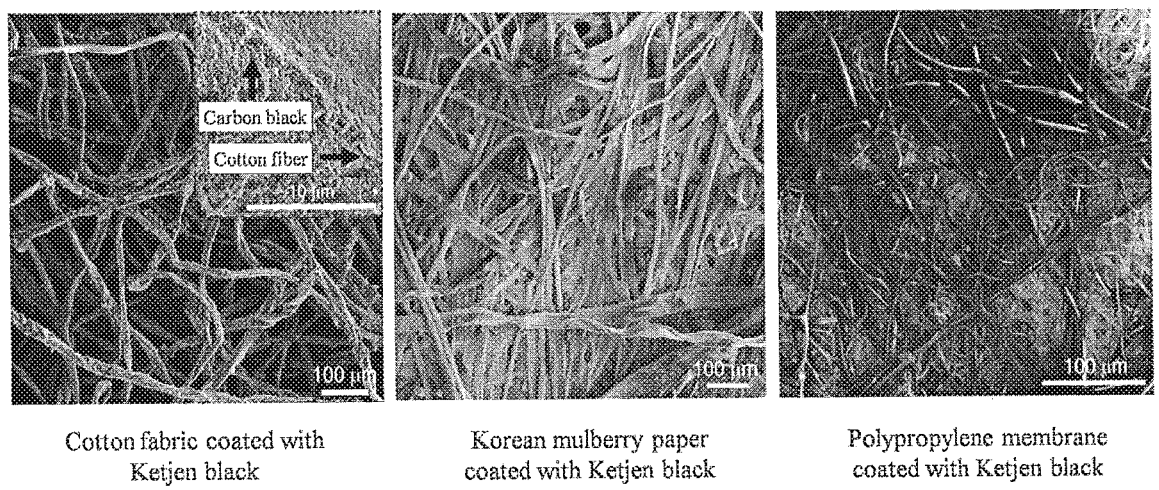
FIG. 3 shows scanning electron microscope photos of cotton fabric, Korean mulberry paper and polypropylene membranes coated with a carbon layer, which have been fabricated according to an embodiment 1 of the present invention.

FIG. 3 is a scanning electron microscope photo of the cotton fabric, Korean mulberry paper and polypropylene membrane electrical energy generation apparatuses on which fabricated Ketjen black was coated. It may be seen that particles on which the carbon layer was coated have been uniformly coated on a cotton fiber strand having a diameter of 10 μm, a Korean mulberry paper fiber strand having a diameter of 8 μm and a polypropylene membrane strand having a diameter of 2 μm.

Figure 4:
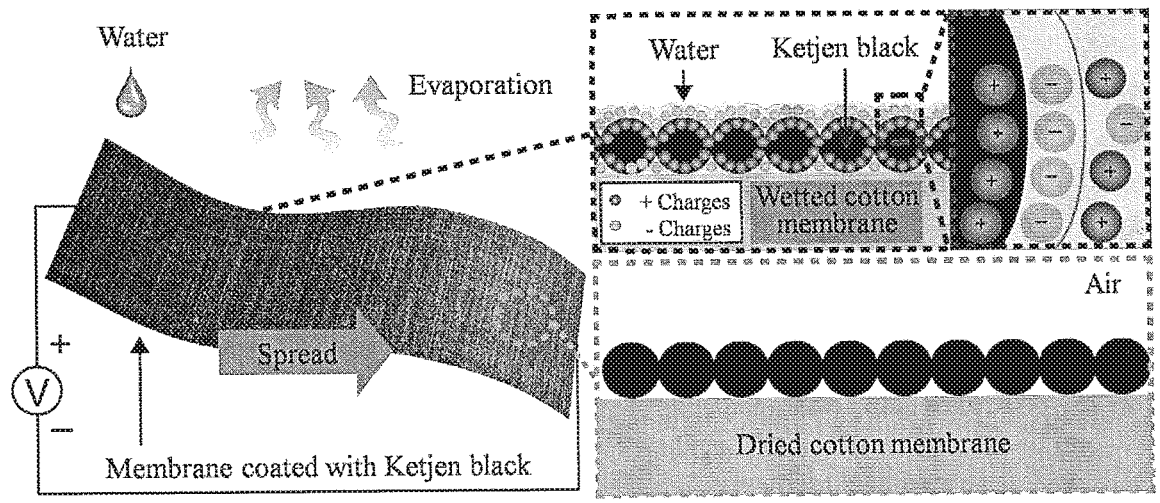
FIGS. 4 and 5 are diagrams showing the principle that the electrical energy generation apparatus based on a hydrophilic fiber membrane coated with a carbon layer according to the present invention generates electrical energy.

FIG. 4 is a diagram showing the mechanism that the electrical energy generation apparatus based on the hydrophilic fiber membrane coated with the carbon layer generates energy. A surface of the carbon particles in the wetted region of water has negative charges due to the double layer, and thus forms a negative potential. For this reason, a potential induced by a capacitance difference is formed between the wetted region and the dry region due to water. In other words, electrical energy may be generated using a voltage difference depending on whether an electric double layer is present between a carbon layer wetted by water and a carbon layer not wetted by water. In this case, a DC voltage and power can be produced by connecting the two electrodes using a circuit.

Figure 5:
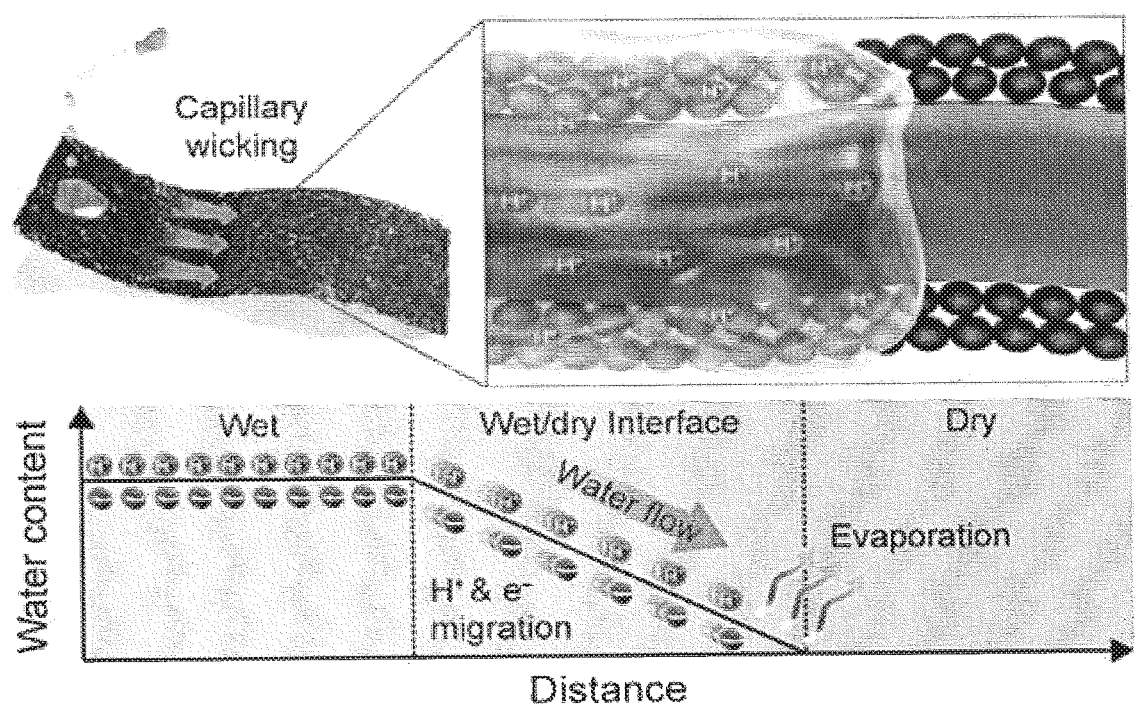

Furthermore, FIG. 5 shows a process in which the excellent water adsorption force of cotton fabric on which Ketjen black (KB) has been coated rapidly moves cations (hydrogen ions) within a polar solvent from the wetted region to the dry region and electrons within carbon move in the same direction as the moving direction of the cations to continuously generate a current in order to maintain charge neutrality. The formed current has a current and power of a DC form because it is continuously generated until the polar solvent is fully evaporated. This is a main cause to generate phenomena that cannot be seen in the existing evaporation-driven streaming potential. Representatively, in the existing flow potential, a voltage according to humidity responds to a humidity change very sensitively, such as that a voltage according to humidity drops almost close to 0V in relative humidity of 90%. The reason for this is that in the existing evaporation-driven streaming potential, a flow of a fluid occurs by only continuous evaporation and a potential may be generated only when such a flow of a fluid is maintained, but if relative humidity is high, a flow of a fluid is congested because evaporation is not well performed.

Figure 6:
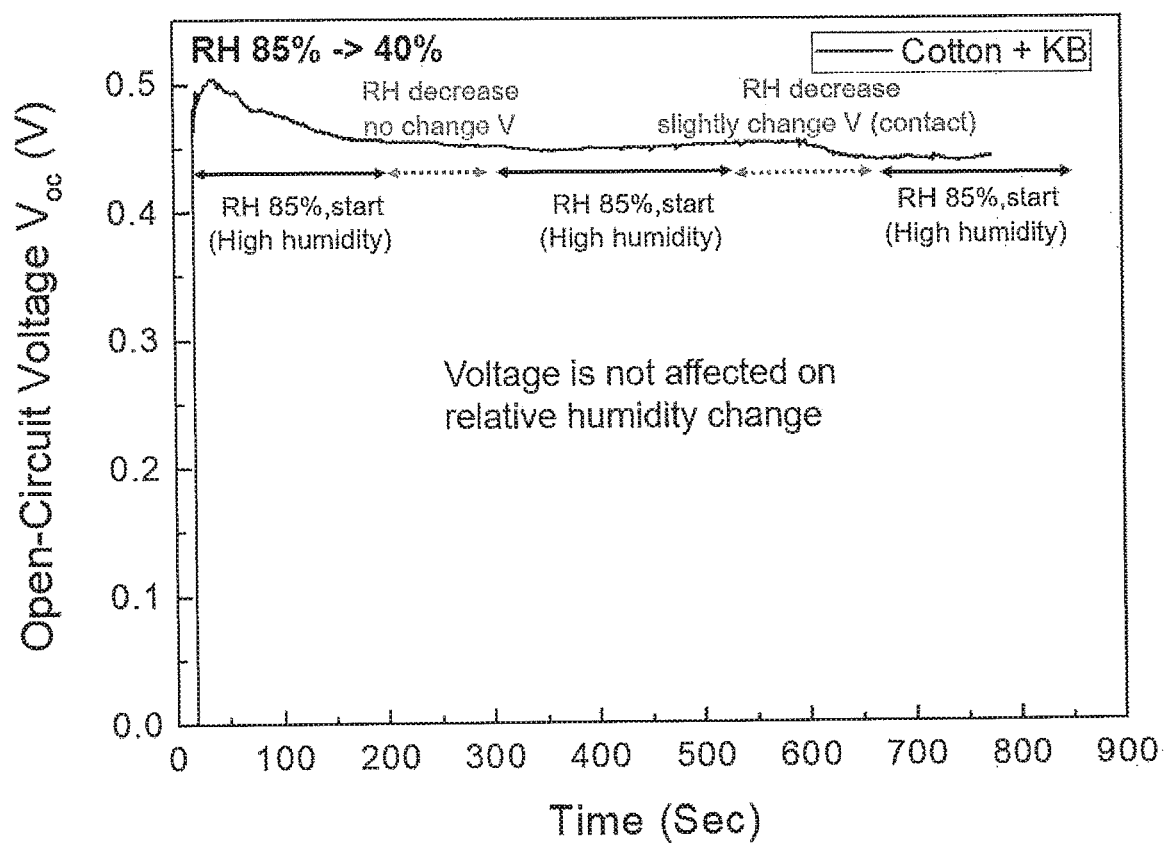
FIG. 6 is a diagram showing an example of a change in the voltage according to a humidity change in an embodiment of the present invention.

In contrast, from FIG. 6, it may be seen that a voltage of electrical energy generated by the double layer-based the electrical energy generation apparatus according to an embodiment of the present invention is rarely affected by a relative humidity change (in particular, a change between 85% and 40%). This shows an energy generation behavior never affected by humidity because the hydrophilic fiber membrane rapidly moves cations within the polar solvent to the extent that it is incomparable with evaporation.

Figure 7:
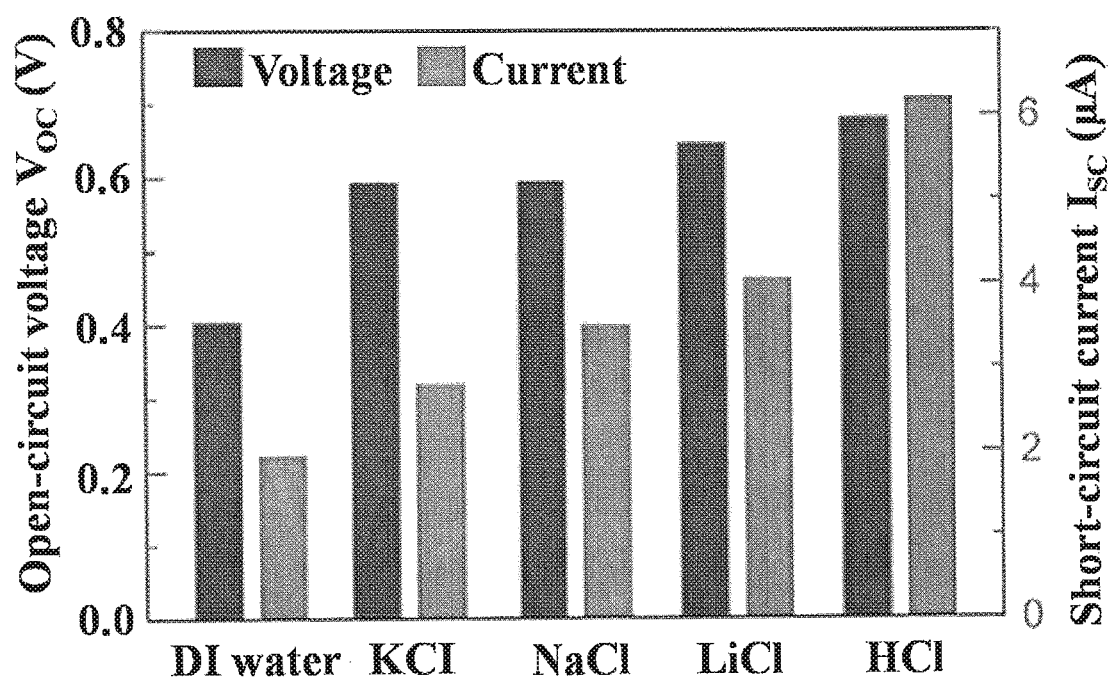
FIG. 7 is a diagram showing an example of a change in the voltage according to a positive ion concentration in an embodiment of the present invention.

Furthermore, a voltage according to the existing evaporation-driven streaming potential is decreased as a concentration of cations is increased. In contrast, from FIG. 7, it may be seen that a voltage and current of electrical energy generated through a potential formed by the double layer according to an embodiment of the present invention are increased according to the addition of various types of 0.1M cations. In particular, it may be seen that a stern layer is greatly affected in order of hydrogen, lithium, sodium and potassium having a smaller ion radius and an increase of a generated voltage is generated.

For example, in the existing evaporation-driven streaming potential, the flow speed of a fluid is limited because a flow of the fluid depends on evaporation itself. Accordingly, an increase in the concentration of cations included in a limited amount of a fluid results in a reduction in the amount of evaporation of the fluid attributable to a reduction in steam pressure because the amount of the fluid itself is limited. Since a reduction in the amount of evaporation may congest a flow of the fluid, a voltage is decreased according to an increase in the concentration of the cations in the existing evaporation-driven streaming potential. In contrast, in the hydrophilic fiber membrane of the present invention, a flow of a fluid is autonomously induced according to the asymmetrical wetting of the polar solvent through a relatively very high polar solvent for the force of adsorption in a relatively very wide surface area. Furthermore, an increase in the moving speed of cations may lead to the generation of a higher current because a relatively very large amount of a flow of a fluid is obtained compared to the existing evaporation-driven streaming potential.

Figure 8:
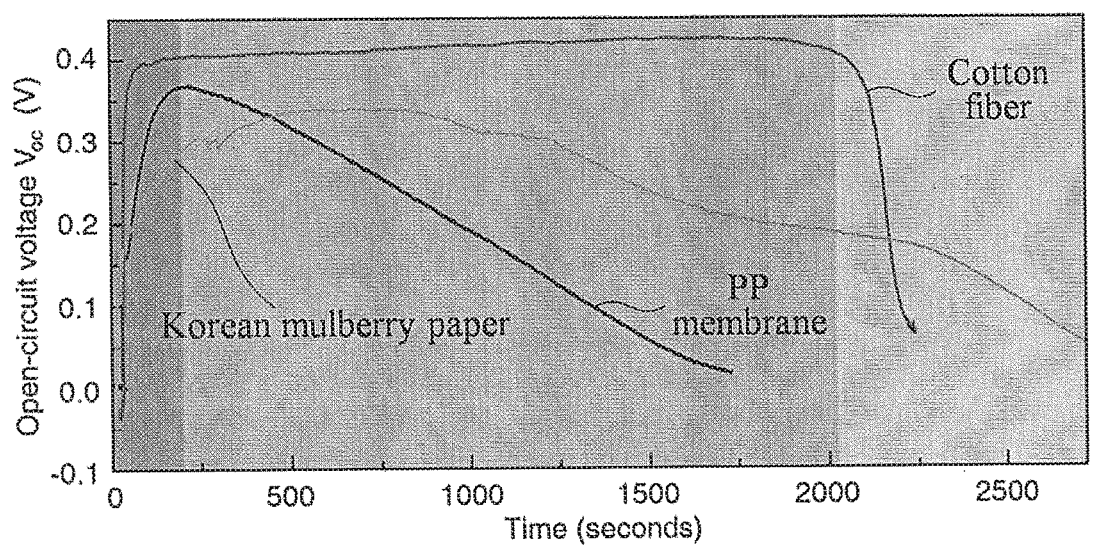
FIG. 8 shows the measured data of voltages obtained from generators based on the cotton fabric, Korean mulberry paper and polypropylene membranes coated with a carbon layer, which were fabricated according to the embodiment 1 of the present invention.

FIG. 8 shows the measured data of open-circuit voltages ($V_{OC}$) generated by the cotton fabric, Korean mulberry paper and polypropylene membrane electrical energy generation apparatuses coated with Ketjen black. For experiments, after a small amount of water of 0.25 ml dropped to one electrode of each of the cotton fabric, Korean mulberry paper and polypropylene membrane generators coated with Ketjen black, characteristic evaluation was performed. The highest open-circuit voltage (0.4 V) was monitored in the cotton fabric coated with the Ketjen black carbon layer among the three kinds of hydrophilic fiber membranes. The cotton fabric showed a higher open-circuit voltage characteristic than the Korean mulberry paper ($V_{OC}$, 0.32 V) coated with the Ketjen black carbon layer and the polyprolylene membrane ($V_{OC}$, 0.36 V) coated with the Ketjen black carbon layer. In particular, the open-circuit voltage value of 0.4 V had a characteristic in which it was stably maintained for 2200 seconds without shaking or reduction. Ketjen black used in the present invention is 1400 $m^2$/g and has a very high specific surface area. It could be seen that Ketjen black on which hydrophilic processing was performed by a surfactant (sodium dodecylbenzenesulfonate (SDBS)) was coated on cotton fabric having a very excellent water absorption ratio, the adsorption of water, that is, a polar solvent, was generated stably and uniformly, and a stable open-circuit voltage characteristic occurred by the water adsorption force of the hydrophilic fiber membrane.

Figure 9A:
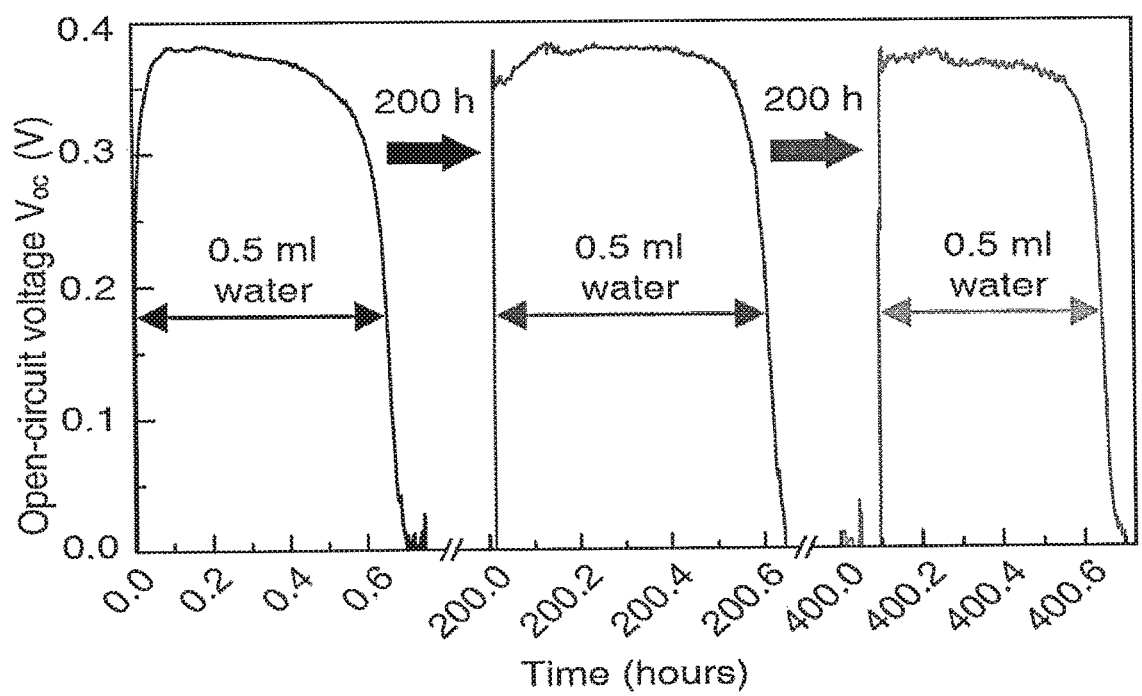
FIGS. 9A and 9B are graphs showing open-circuit voltage characteristics according to repetitive water wetting of a cotton fabric generator coated with a carbon layer (and Ketjen black), which was fabricated according to the embodiment 1 of the present invention.
Figure 9B:
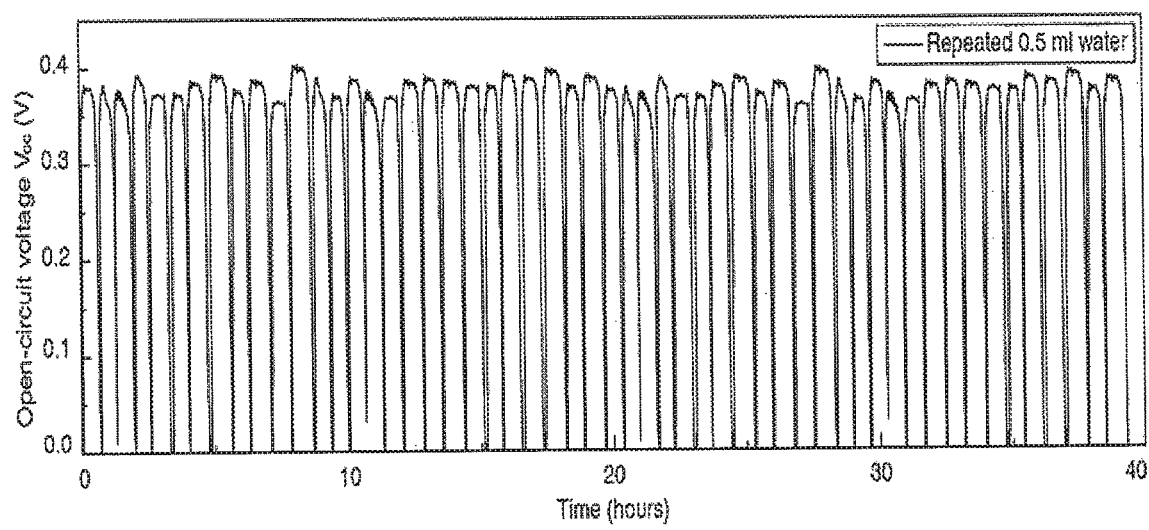

FIGS. 9A and 9B are graphs showing open-circuit voltage characteristics according to the repetitive water wetting the cotton fabric generator coated with the carbon layer (Ketjen black). Water of 0.5 ml dropped to one electrode of the generator, the characteristics of the generator were evaluated, and characteristic evaluation was performed three times at intervals of 200 hours for perfect water evaporation.

As shown in FIG. 9A, a voltage of 0.4 V was generated by dropping a very small amount of water of 0.5 ml, and a voltage was 0 V after water was fully evaporated. It could be seen that if water of 0.5 ml was dropped, a 0.4 V open-circuit voltage characteristic having the same shape appeared and the same behavior was monitored in three experiments. FIG. 9B is a graph showing excellent reappearance of the carbon layer-hydrophilic fiber membrane (cotton fabric) generator, and it may be seen that a very uniform behavior is repeated by water dropping of 53 times.

Figure 10:
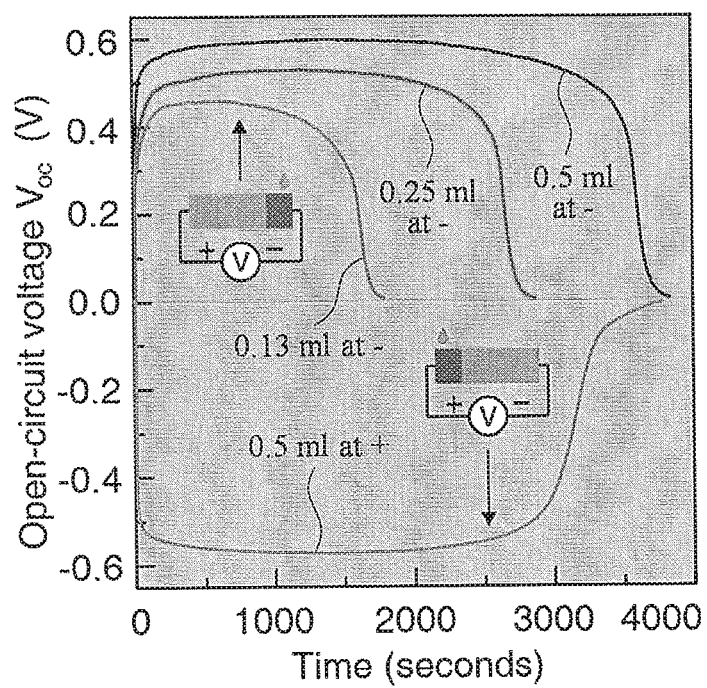
FIG. 10 shows the results of an open-circuit voltage graph characteristic according to a change in the water wetting amounts (0.15 ml, 0.25 ml, 0.5 ml) and water wetting positions of the cotton fabric generator coated with a carbon layer (and Ketjen black), which was fabricated according to the embodiment 1 of the present invention.

FIG. 10 shows the results of open-circuit voltage graph characteristics according to water wetting amounts (0.15 ml, 0.25 ml and 0.5 ml) of the cotton fabric generator coated with the carbon layer (Ketjen black) and a change in the water wetting position. It may be seen that when a small amount of water was dropped, the open-circuit voltage was formed a little low because wetting did not occur in a sufficient area (a maximum voltage of 0.45 V in the case of 0.15 ml), whereas as the amount of water increased (a maximum voltage of 0.5 V in the case of 0.25 ml), the voltage was increased, and when water of 0.5 ml was dropped, a voltage of 0.6 V was maintained for a longer time. In particular, it could be seen that if the position of an electrode to which water was dropped was reversed, an opposite voltage of −0.6 V was formed and thus a change in the position where the electric double layer was formed derived a change in the polarity of the open-circuit voltage.

Figure 11A:
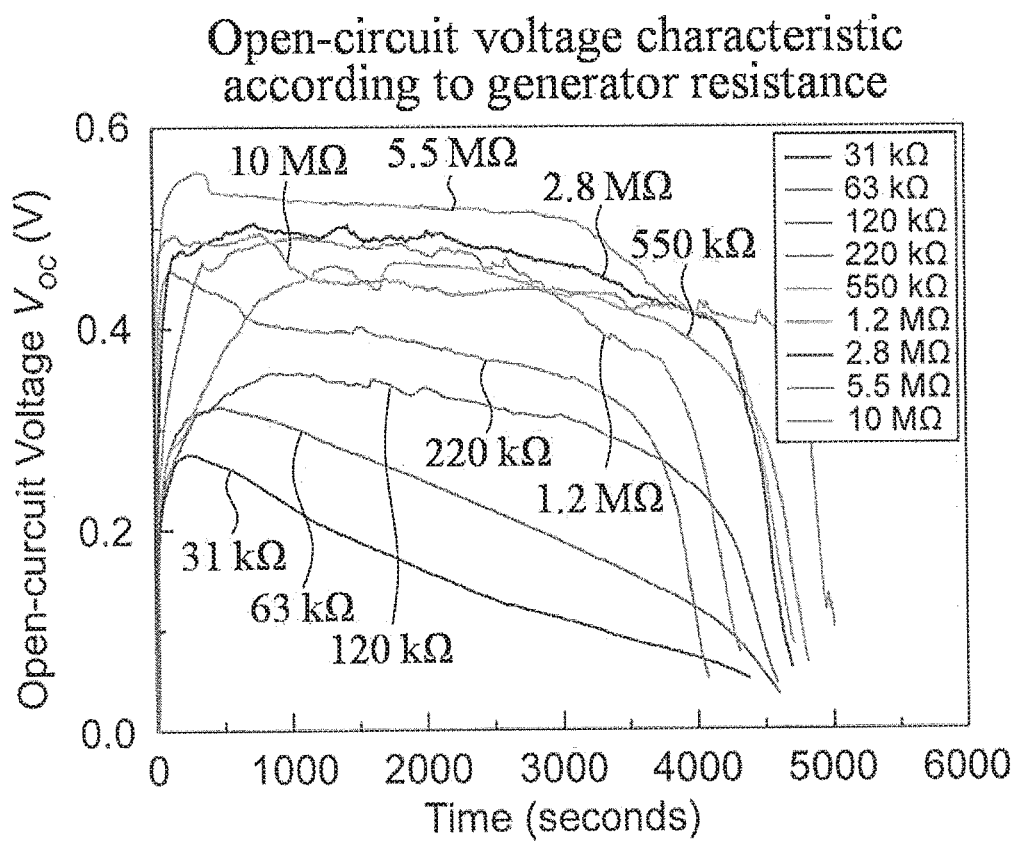
FIGS. 11A-11C show the results of an open-circuit voltage (FIG. 11A), short-circuit current (FIG. 11B), and obtained power (FIG. 11C) as graphs according to a change in the resistance of the cotton fabric generator coated with a carbon layer (and Ketjen black), which was fabricated according to the embodiment 1 of the present invention.
Figure 11B:
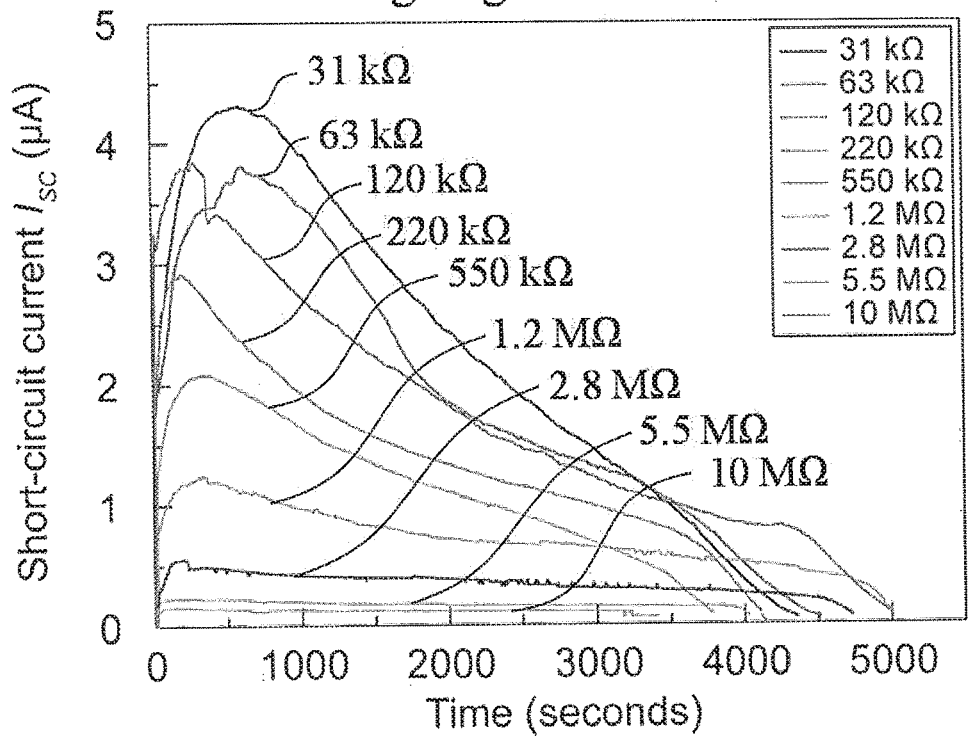
Figure 11C:
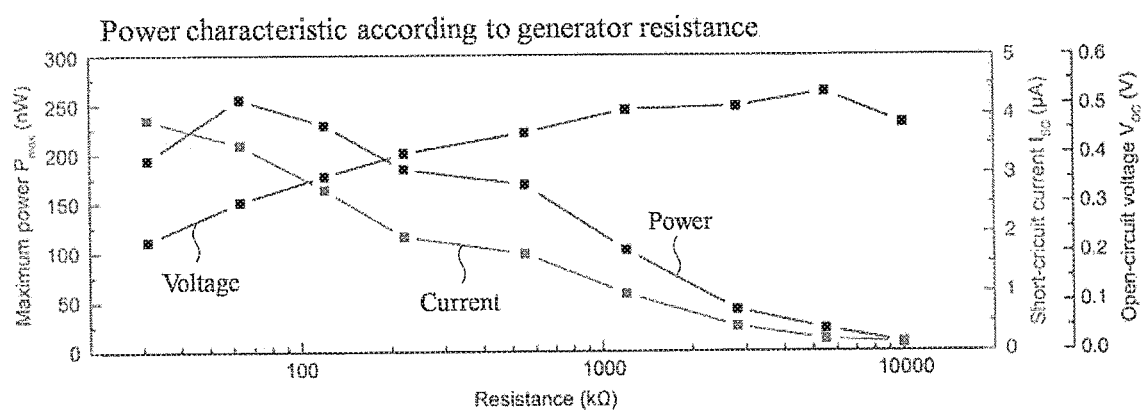

FIGS. 11A-11C show the results of an open-circuit voltage (FIG. 11A), short-circuit current (FIG. 11B) and obtained power (FIG. 11C) as graphs according to a change in the resistance of the cotton fabric generator coated with the carbon layer (Ketjen black). As described in Embodiment 1, resistance of the carbon layer (Ketjen black)-hydrophilic fiber (cotton fabric) membrane generator was adjusted by making different the number of times that cotton fabric was impregnated into the solution in which Ketjen black was dispersed. As the number of impregnations increases, the amount of carbon particles coated on a surface increases lower resistance. Accordingly, 9 samples were prepared so that the resistance increased to 31 kΩ, 63 kΩ, 120 kΩ, 220 kΩ, 550 kΩ, 1200 kΩ, 2800 kΩ, 5500 kΩ, and 10000 kΩ. As may be seen from the open-circuit voltage graph of FIG. 11A; as resistance of the generator rises, a high open-circuit voltage (10 MΩ sample: 0.54V) characteristic appears. In the sample of 31 kΩ having the lowest resistance, a low open-circuit voltage characteristic of a 0.18 V level is monitored. It may be seen that to control the base resistance of the generator based on the carbon layer-hydrophilic fiber membrane is important in order to obtain a high open-circuit voltage characteristic. FIG. 11B is a short-circuit current characteristic graph according to a change in the resistance of a generator. It may be seen that in a generator having resistance of 31 kΩ, the highest short-circuit current (4.4 µA) characteristic is monitored and the short-circuit current characteristic is decreased as the resistance is lowered. In particular, in a sample having resistance of 10 MΩ, a low short-circuit current characteristic of a 0.2 µA level is monitored. It is important to assign a high open-circuit voltage and a high short-circuit current characteristic value at the same time because power is determined by the product of a current and a voltage. In the case of the present the generator based on the carbon layer-hydrophilic fiber membrane, maximum values of an open-circuit voltage and a short-circuit current value are monitored in opposite resistance values. Accordingly, in order to monitor a resistance band where the best power can be obtained, a power graph was drawn as in FIG. 11C. Maximum power ($P_{max}$) showed a value of about 260 nW in the generator having 63 kΩ.

Figure 12:
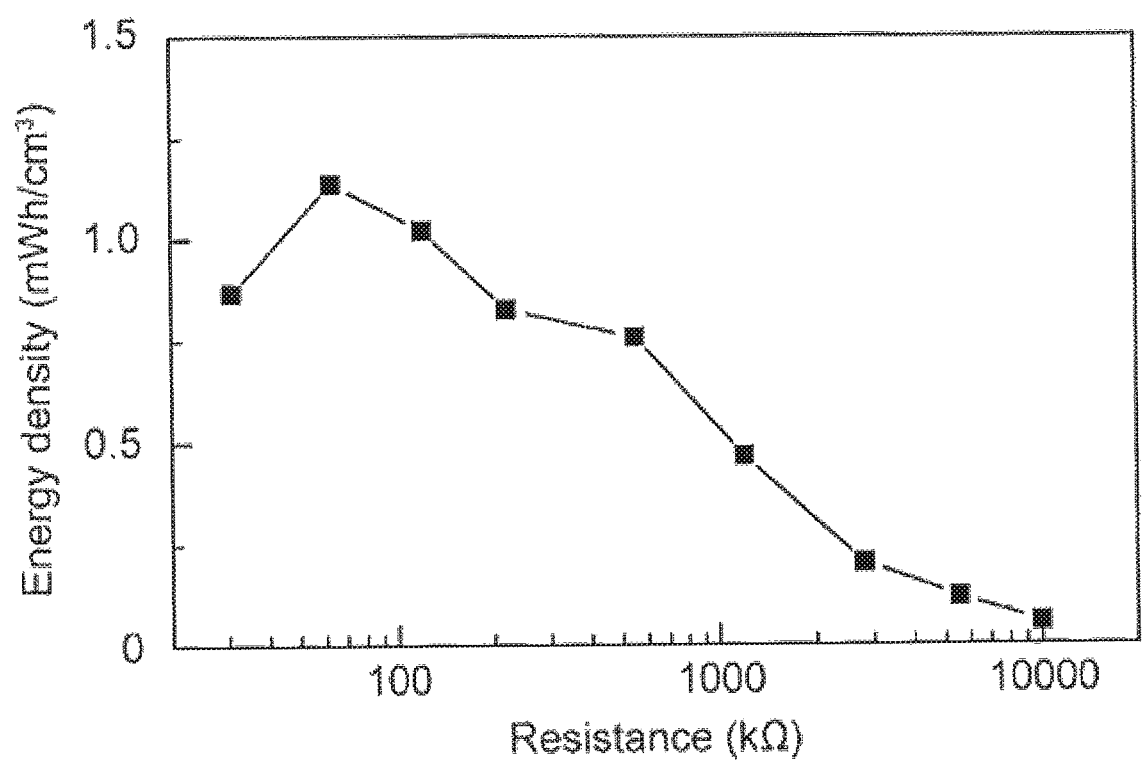
FIG. 12 shows an energy density graph of the cotton fabric generator coated with a carbon layer (and Ketjen black), which was fabricated according to the embodiment 1 of the present invention.

FIG. 12 is an energy density graph of the cotton fabric generator coated with the carbon layer (Ketjen black), which was fabricated according to the embodiment 1 of the present invention. In the energy density calculation values of FIG. 12, the highest energy density characteristic value of 1200 μWh/cm$^3$ is monitored in the sample having 63 kΩ. It may be seen that as resistance starts from 31 kΩ and rises, energy density gradually rises, the resistance reaches a maximum value at 63 kΩ, the energy density gradually decreases as the resistance further rises, and the energy density characteristic value is a 60 ΞWh/cm$^3$ level at 10 MΩ and is much lower than an energy density value (750 μWh/cm$^3$) at 31 kΩ. Accordingly, it is important to fabricate a complex generator based on a carbon layer-hydrophilic fiber membrane having the best resistance band in generating a voltage, a current and power.

Embodiment 2: Fabrication of Electrical Energy Generation Apparatus Coated Based on Cotton Fabric With Graphene Oxide (GO) and Carbon Nanotubes (CNTs) Using Dipping Process In order to fabricate a GO coating solution, GO 0.2 g and a surfactant (sodium dodecylbenzenesulfonate (SDBS)) 0.05 g were mixed with deionized water of 20 ml. A GO coating solution was fabricated by uniformly mixing and dispersing the mixed GO solution through sonication. Cotton fabric was cut in a standard of 3 cm (length)×9 cm (breadth) and dipped into a solution in which GO was dispersed once. The cotton fabric coated with the dipped GO was placed on a flat tray. A cotton membrane electrical energy generation apparatus coated with GO was finally fabricated through a dry process in a dry oven of 80° C.

In order to fabricate a CNTs coating solution, CNTs 0.2 g and a surfactant (sodium dodecylbenzenesulfonate (SDBS)) 0.05 g were mixed with deionized water of 20 ml. A CNTs coating solution was fabricated by uniformly mixing and dispersing the mixed CNTs solution through sonication. Cotton fabric was cut in a standard of 3 cm (length)×9 cm (breadth) and dipped into a solution in which CNTs were dispersed once. The cotton fabric coated with the dipped CNTs was placed on a flat tray. A cotton membrane electrical energy generation apparatus coated with CNTs was finally fabricated through a dry process in a dry oven of 80° C.

Figure 13:
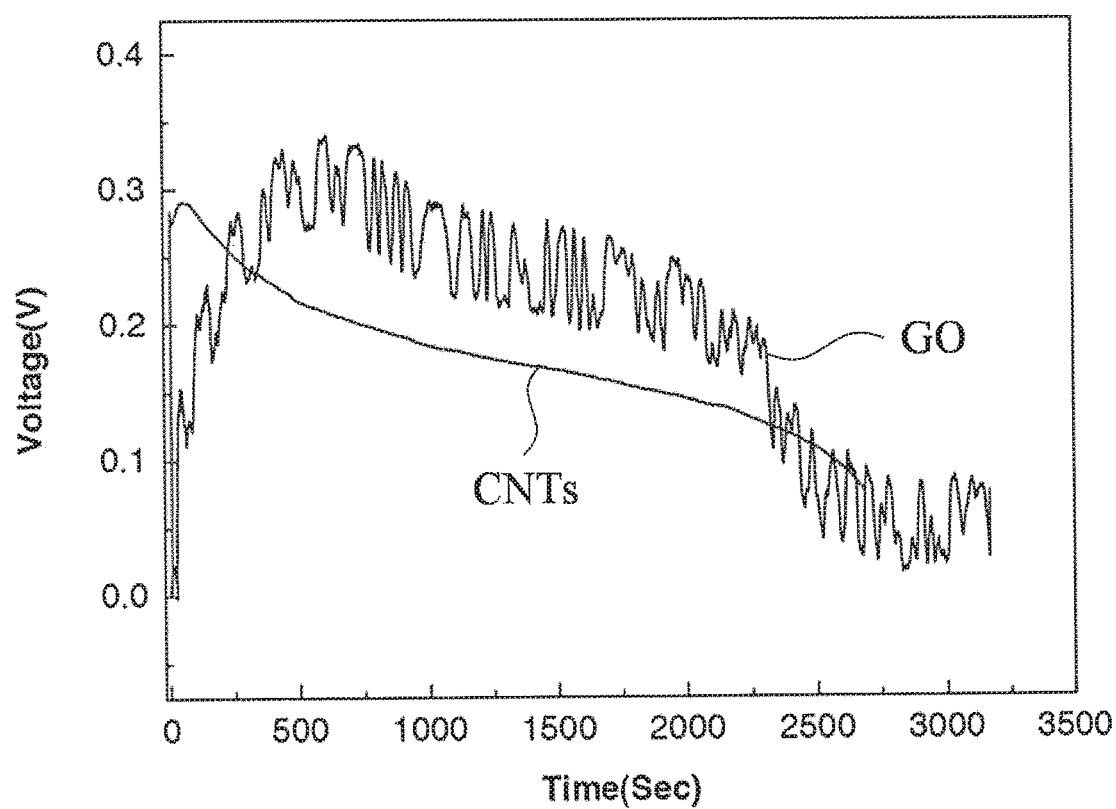
FIG. 13 shows the measured data of voltages formed by the cotton fiber generator coated with carbon nanotubes (CNTs) and grapheme oxide, that is, a carbon layer, which was fabricated according to an embodiment 2 of the present invention.

FIG. 13 shows the measured data of voltages generated by the cotton fabric electrical energy generation apparatuses respectively coated with carbon nanotubes (CNTs) and graphene oxide (GO). The cotton fabric generators coated with GO and CNTs show similar open-circuit voltage characteristics having maximum of 0.3V. However, the cotton fabric generator coated with GO showed a little unstable open-circuit voltage. The cotton fabric generator coated with CNTs showed a graph characteristic that after an open-circuit voltage of 0.3 V was reached, the voltage continued to decrease. Cotton fabric was dipped into the solutions in which 2-D GO and 1-D CNTs were dispersed. Accordingly, it could be seen that an unstable and low open-circuit voltage characteristic was monitored compared to the cotton fabric generator coated with carbon particles because the cotton fabric was not uniformly coated on each fiber forming the cotton fabric. It could be seen that although there was a difference in the open-circuit voltage value, the voltage difference occurred due to the asymmetrical coating of a polar solvent with respect to various carbon materials.

COMPARATIVE EXAMPLE 1

Fabrication of Electrical Energy Generation Apparatus Based on Glass Substrate Coated with Carbon Layer It is difficult to uniformly coat carbon particles not having viscosity in terms of process because polymer binder is not added to a glass substrate having a hydrophobic characteristic. Accordingly, in this comparative example, glass substrate coated with Ketjen black was fabricated using a process of projecting Ketjen black particles coated on cotton fabric onto the glass substrate. In Embodiment 1, the fiber membrane including cotton fabric having excellent wetting characteristic under the Ketjen black carbon layer was used as a support. In contrast, in Comparative Example 1, characteristic evaluation was performed using the glass substrate not having hydrophile. In the case of a glass substrate on which surface plasma processing was not performed, an open-circuit voltage characteristic was almost 0. Accordingly, the Ketjen black carbon layer was projected onto the glass substrate on which oxygen plasma processing was performed so that wetting occurred on the glass substrate, and then characteristic evaluation was performed.

Figure 14:
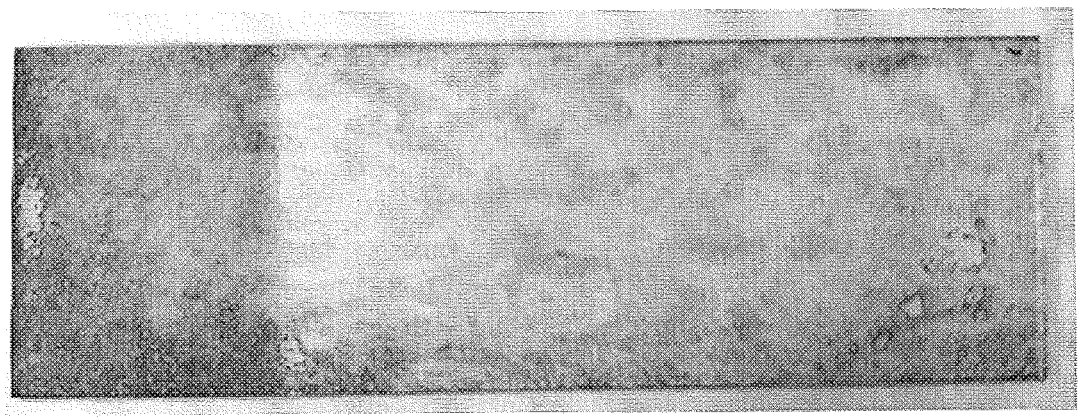
FIG. 14 is an actual photo of a glass substrate generator coated with a carbon layer according to a comparative example 1.

FIG. 14 is a photo showing an actual shape of the electrical energy generation apparatus based on the glass substrate coated with Ketjen black. It could be seen that there was a portion not partially coated on the glass substrate, but the carbon layer was coated thinly and uniformly generally.

Figure 15:
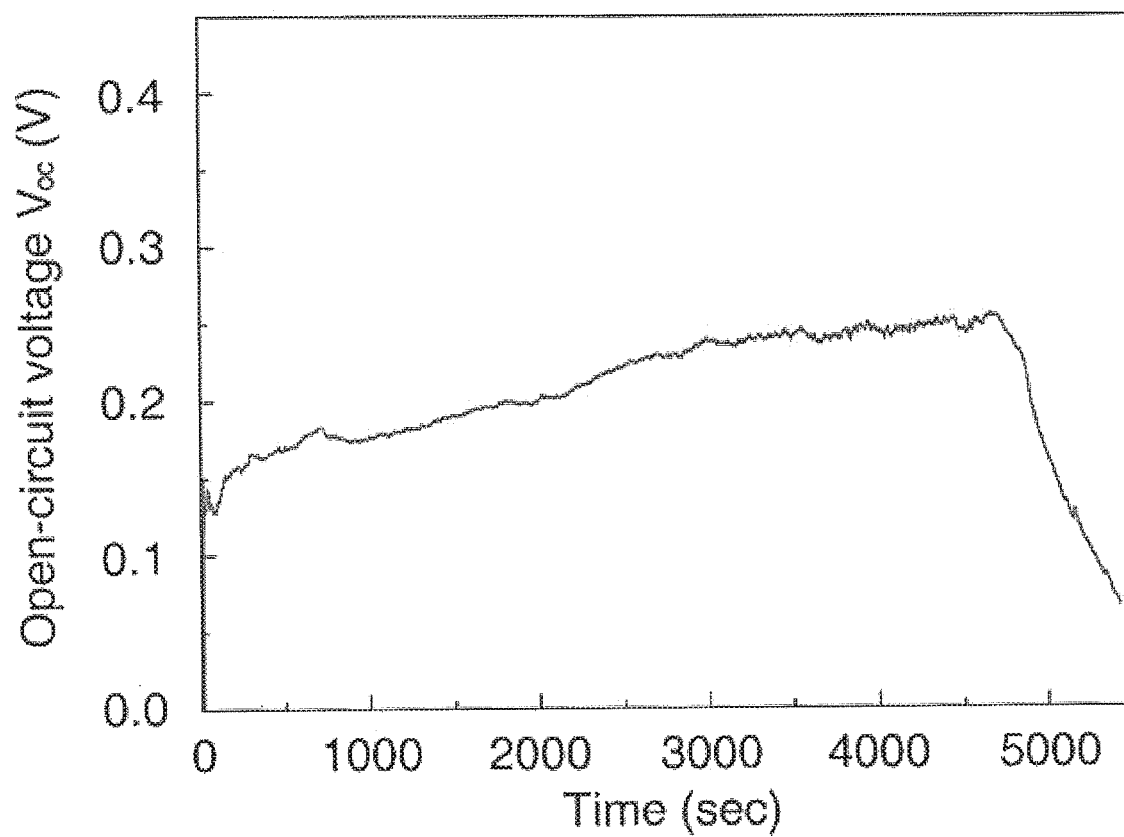
FIG. 15 shows the measured data of voltages formed by the glass substrate generator coated with a carbon layer according to the comparative example 1.

FIG. 15 shows the measured data of voltages generated by electrical energy generation apparatuses based on a glass substrate coated with a carbon layer. It could be seen that a voltage 0.2 V lower than that of cotton fabric was formed in the glass substrate. In the case of the glass substrate, it may be seen that an open-circuit voltage of a given level (0.2 V) is monitored because the substrate using special plasma processing was used, but characteristics gradually drop in repetitive measurement. The characteristics of artificial oxygen functional groups generated on a carbon surface by oxygen plasma processing are deteriorated over time after a temporary hydrophilic characteristic is assigned. Accordingly, embodiments and comparative example experiments reveal that a generator operating stably for a longer time can be fabricated because the artificial oxygen functional groups have excellent hydrophile like cotton fabric compared to a substrate that requires special processing and have an adsorption force capable of containing water for a long time.

Figure 16:
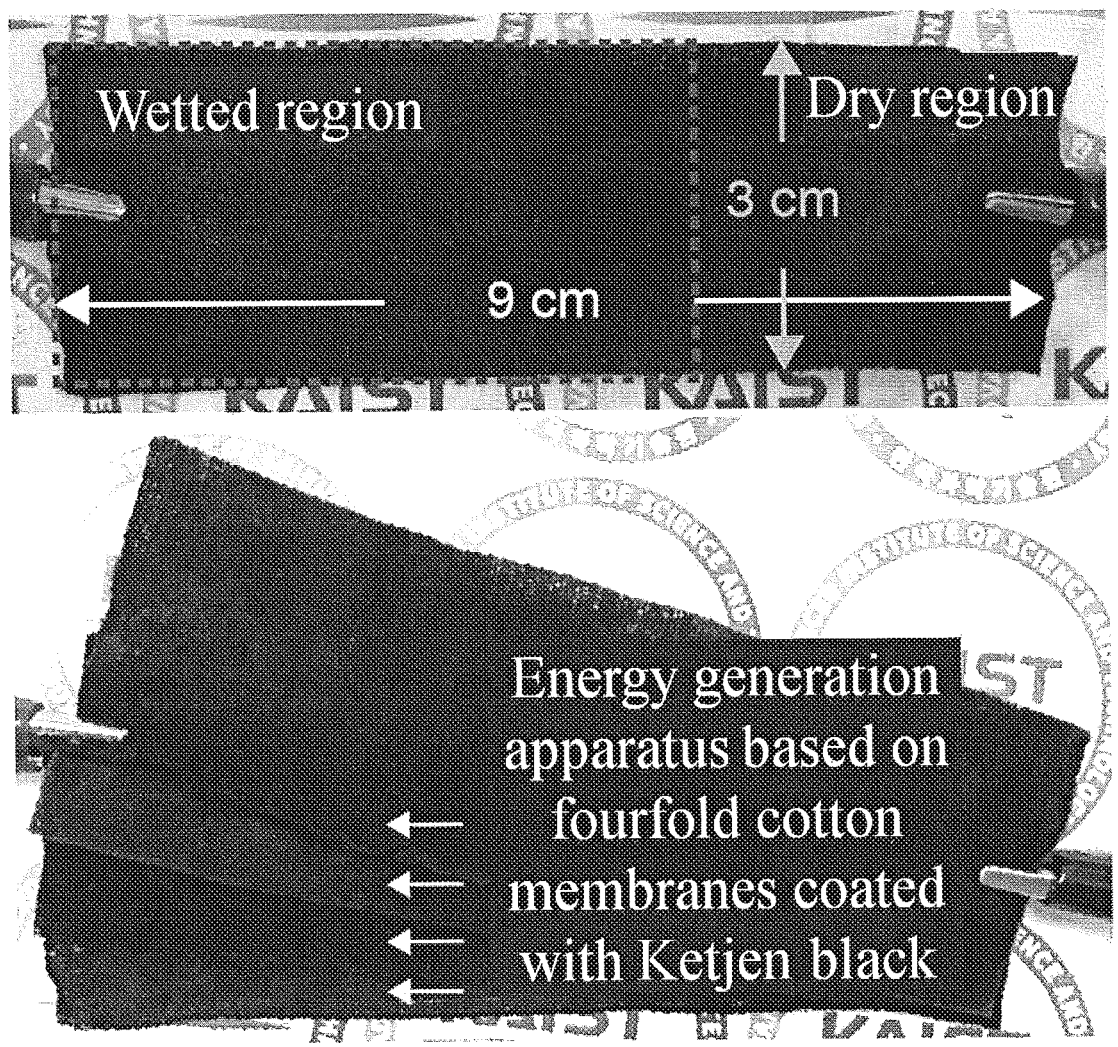
FIG. 16 shows a photo of a hydrophilic fiber membrane generator coated with a carbon layer, which was fabricated according to an embodiment 4 of the present invention, and a photo of stacked generators.

Embodiment 3: Drying of LED Using Electrical Energy Generation Apparatus Based on Cotton Fabric Coated With Ketjen Black FIG. 16 shows an actual shape of an electrical energy generation apparatus based on cotton fabric coated with Ketjen black. The fabricated electrical energy generation apparatus based on cotton fabric coated with Ketjen black was fabricated in the standard of 3 cm (length)×9 cm (breadth) size corresponding to the aspect ratio 3 in which water is effectively adsorbed and an asymmetrical wetting state can be well maintained. The thickness of cotton fabric used was a range of 10 μm~1 mm. Furthermore, the electrical energy generation apparatus based on cotton fabric coated with Ketjen black may be used as a stack structure.

The stacking is possible up to at least two layers to a maximum of 200 layers. There is no limit to a specific stacking thickness. The greatest advantage of the stacking is that energy density can be easily increased. In particular, a marginal space capable of further containing water between two stacked layers is formed. Accordingly, a generator that continues for a longer time can be fabricated because the amount of adsorbed water is increased as the number of stacked layers increases.

Figure 17:
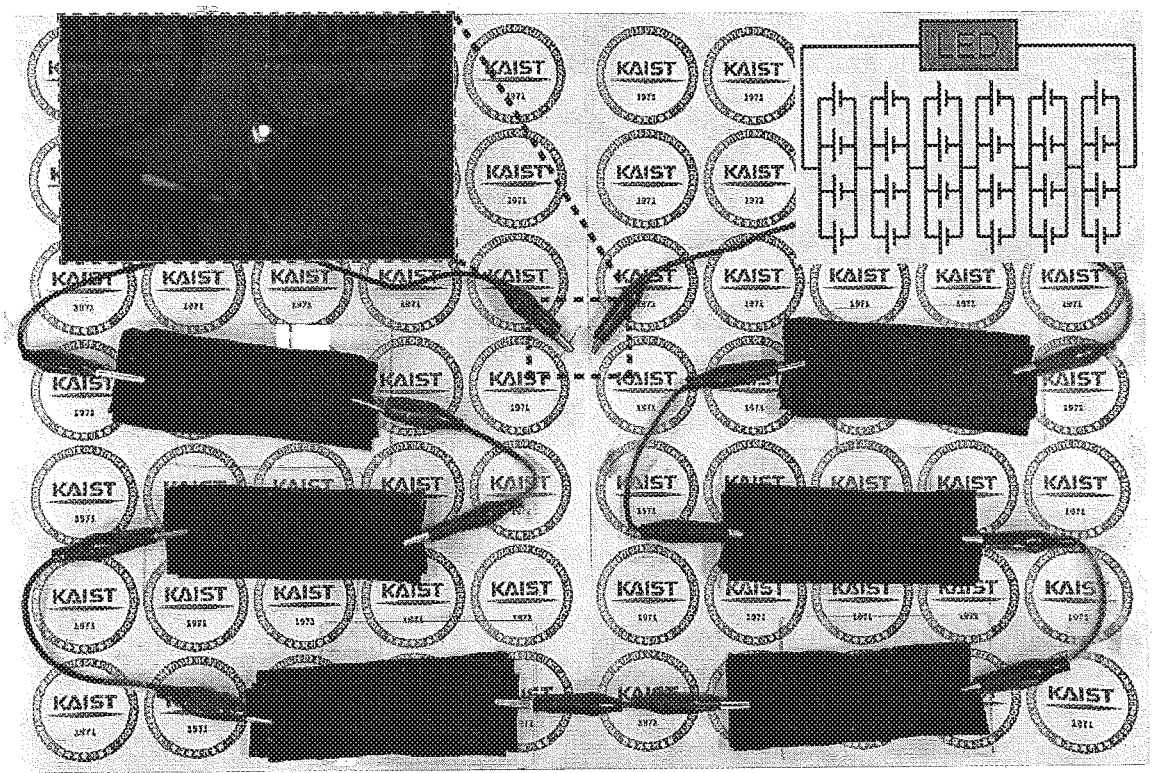
FIG. 17 is a photo showing the state in which an LED having a driving current and voltage of 20 mA, 1.8 V is driven after electrical energy generation apparatuses fabricated according to the embodiment 4 of the present invention are stacked or connected in series and in parallel and then water drops.

FIG. 17 shows a photo in which LEDs having a driving voltage of 1.8 V and a maximum rating current of 20 mA are directly connected without a rectifier circuit and driven by DC power generated by the electrical energy generation apparatuses based on cotton fabric coated with Ketjen black, connected in a series stacking structure. 4 stacking-connected electrical energy generation apparatuses were connected to 6 stacking-connected electrical energy generation apparatuses in series to maximize brightness of the LEDs. A total of 24 carbon layer (Ketjen black)-hydrophilic fiber membranes were used. The LEDs that require power of mW or more were driven for a maximum of 2 hours through only an operation of simply dropping water of 12 ml.

Figure 18:
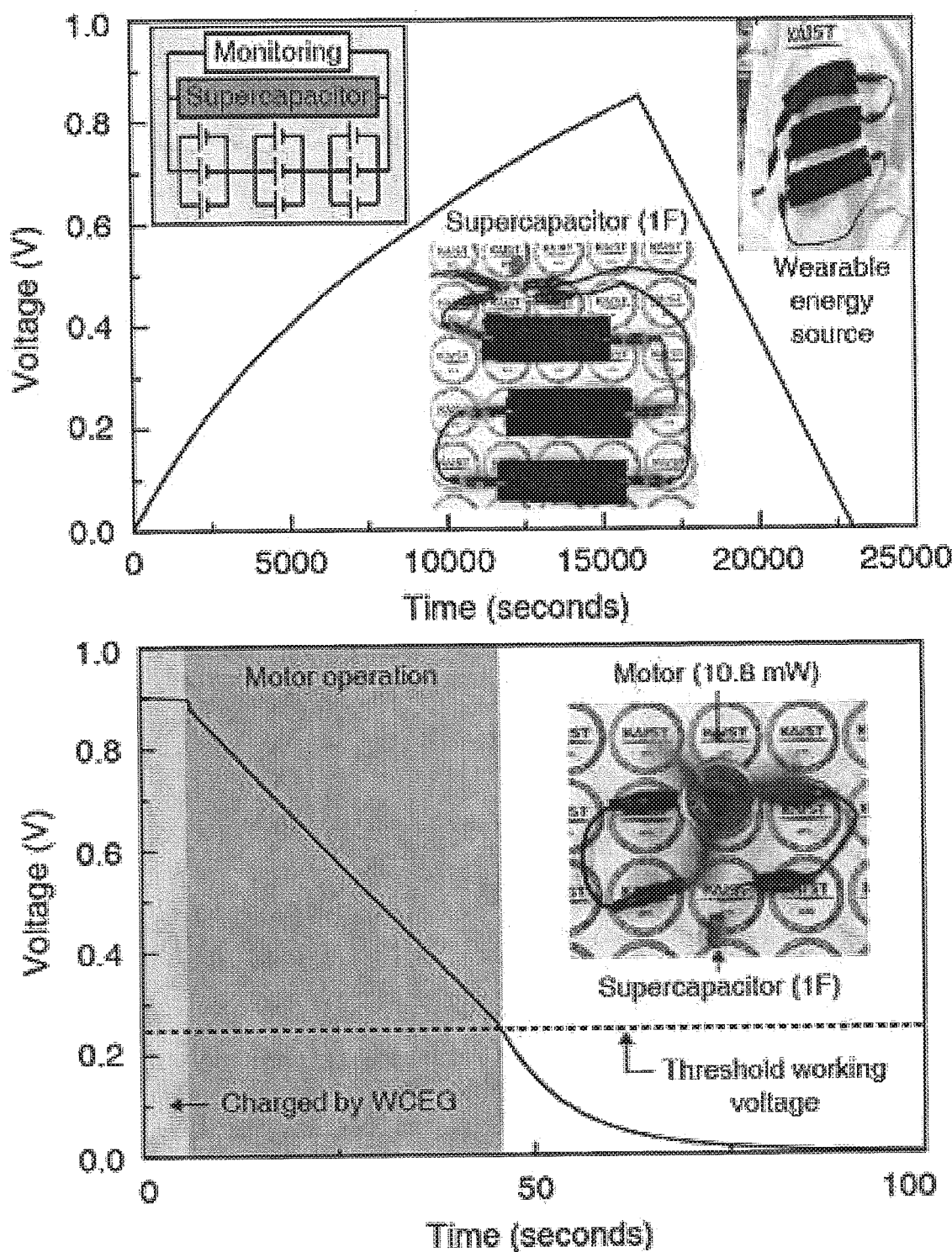
FIG. 18 is a photo showing the state in which the electrical energy generation apparatuses fabricated according to the embodiment 4 of the present invention are stacking-connected in series and in parallel and a motor having rated power of 10 mW is actually driven by dropping water.

Embodiment 4: Driving of Electric Fan Using Energy Charged into Supercapacitor Using Electrical Energy Generation Apparatus Based on Cotton Fabric Coated With Ketjen Black FIG. 18 shows that DC power was generated by attaching the electrical energy generation apparatus based on cotton fabric coated with Ketjen black, connected in a series-stacking structure, to clothes. 3 stacking-connected electrical energy generation apparatuses were are connected to 3 stacking-connected electrical energy generation apparatuses again in series, and thus a 10 F supercapacitor was charged with up to 0.85 V. Furthermore, the polarity of the electrical energy generation apparatuses based on a cotton membrane coated with Ketjen black was reversely connected to the charged supercapacitor, thereby artificially discharging the supercapacitor up to 0 V. The supercapacitor charged by the cotton membrane generator coated with Ketjen black successfully driven a motor of 10 mW for 40 seconds. From the results of FIG. 18, it could be seen that the electrical energy generation apparatus can be fabricated using cotton fabric and carbon that may be easily obtained in real life and electrical energy can continue to be easily generated and stored through an operation of simply dropping water.

Hereinafter, an electrical energy generation apparatus based on a hydrophilic fiber membrane coated with a conductive polymer layer and a method of fabricating the same are described in detail with reference to the accompanying drawings.

The present invention relates to an electrical energy generation apparatus for generating electrical energy through an operation of asymmetrically wetting a polar solvent. (preferably, a small amount of a polar protic solvent containing ions) to only a region connected to one of two electrodes connected to a hydrophilic fiber membrane coated with a conductive polymer layer using unique high voltage generation efficiency formed in a process of adsorption on a surface of conductive polymers, that is, a pseudocapacitor material to a surface of which both anions and cations can adhere by the asymmetrical wetting of a polar solvent (preferably, polar protic solvent containing ions) and a flow of a fluid, and a method of fabricating the same. A potential is formed between a wetted region and a dry region due to a capacitance difference occurring due to physical adsorption for lowering surface energy. The potential formed by capacitance difference can be maintained in the long term until the polar solvent is fully evaporated. Furthermore, the high polar solvent adsorption force of a hydrophilic fabric fiber strand moves hydrogen molecules (hydrogen ions), included in the polar solvent, from the wetted region to the dry region, and a flow of electrons within conductive polymers caused in order to maintain charge neutrality is used.

An embodiment of the present invention provides an individual electrical energy generation apparatus for generating high-performance electrical energy of a DC voltage-current form and a method of fabricating a large-area electrical energy generation apparatus in which a plurality of such electrical energy generation apparatuses has been combined based on that pseudocapacitor materials capable of adsorbing both anions/cations onto its surface have higher adsorption efficiency than an electric double layer material, such as the existing carbon series. The present invention can greatly improve energy generation efficiency using conductive polymers capable of adsorbing both cations and anions compared to a carbon layer (carbon particles, graphenes, graphene oxide, carbon nanotubes, etc.) in which only an electric double layer is formed. Unlike in the existing electric double layer adsorption, the pseudocapacitor material can have high energy generation efficiency because it can use both anions and cations. The electrical energy of a DC form generated by the electrical energy generation apparatus based on the conductive polymers can be directly connected to a high-power electronic device without a separate rectifier circuit and can drive the electronic device.

As described above, the embodiments of the present invention have advantages in that the hydrophilic fiber membrane coated with the conductive polymer layer can be mass-produced at a low cost through a simple dipping process, a large-area electrical energy generation apparatus can be easily fabricated, and a generated voltage and current can be easily controlled through stacking between the hydrophilic fiber membranes coated with the conductive polymer layers.

Figure 19:
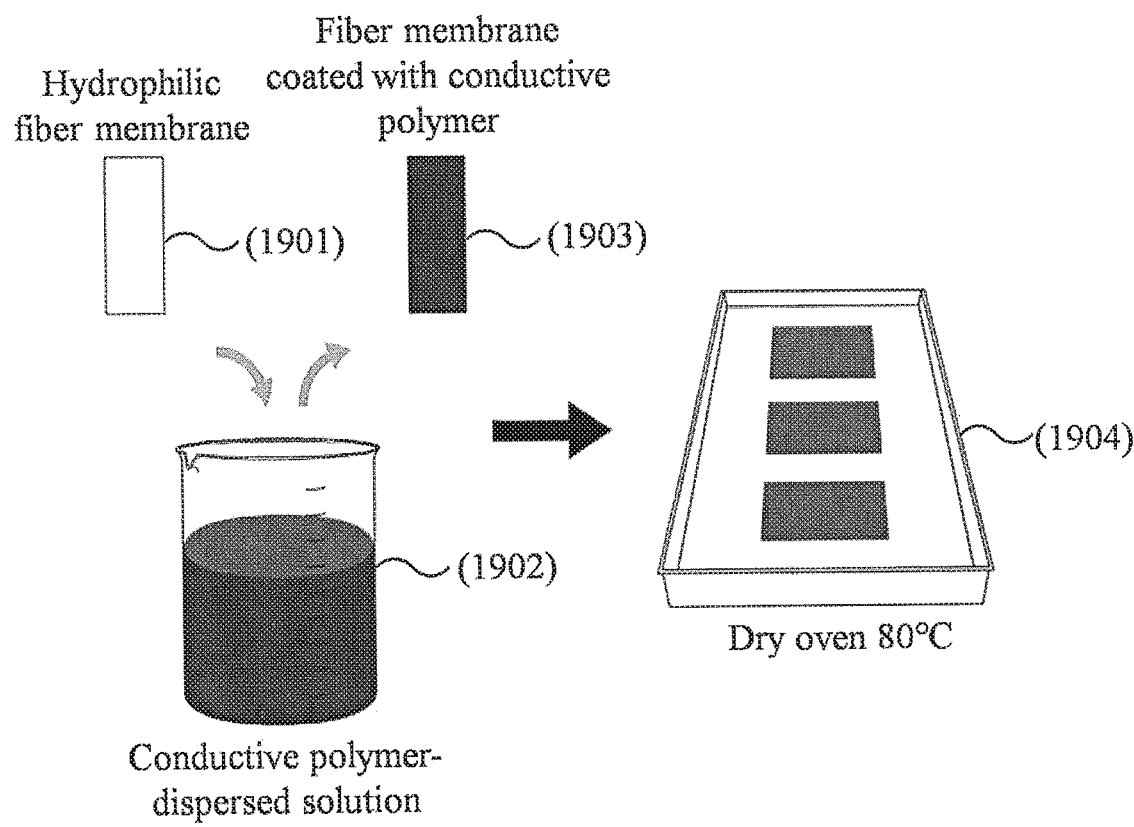
FIG. 19 is a fabrication diagram of the electrical energy generation apparatus based on a hydrophilic fiber membrane coated with a conductive polymer layer, which is a fabrication process of the present invention.

FIG. 19 is a diagram showing a process of fabricating the electrical energy generation apparatus based on a hydrophilic fiber membrane coated with a conductive polymer layer according to an embodiment of the present invention. A hydrophilic fiber membrane 1901 cut in a given standard (e.g., 3 cm (length)×9 cm (breadth)) is dipped into a conductive polymer coating solution 1902 in which conductive polymers have been dispersed. The thickness and uniformity of the conductive polymer layer coated on a surface of the hydrophilic fiber membrane may be controlled by adjusting the number of times of dipping during the dipping process. The dipped hydrophilic fiber membrane 1903 on which the conductive polymer layer has been uniformly coated may be completed through a dry process 1904 in a dry oven. Resistance of the electrical energy generation apparatus based on the hydrophilic fiber membrane during the dry process may be included in a range of 1 kΩ~100 MΩ. Furthermore, the diameter of a hydrophilic fiber strand included in the hydrophilic fiber membrane 1903 has a range of several tens of nm to several hundreds of μm (e.g., 50 nm~500 μm).

In other words, the pseudocapacitor materials having a complex adsorption characteristic in which both anions and cations can be adsorbed may include a hydrophilic fiber membrane coated with a conductive polymer layer for generating high-performance electrical energy of a DC voltage-current form based on high adsorption efficiency compared to the existing electric double layer material, such as carbon series. In this case, the electrical energy generation apparatus may generate electrical energy in such a manner that opposite polarities are formed in a wetted region and a dry region because the conductive polymers of the wetted region is adsorbed onto a polar solvent by the asymmetrical wetting of the polar solvent on a surface of the conductive polymer layer. For example, electrical energy may be generated using a potential (voltage difference) caused by capacitance generated depending on whether an electric double layer is present between conductive polymers wetted by the polar solvent and conductive polymers not wetted by the polar solvent. A surface of the wetted region has negative charges by the electric double layer on a surface of the conductive polymers by the polar solvent, such as a solution containing cations and the anions, thereby forming a negative potential. Accordingly, a potential difference may be formed between the wetted region and the dry region by the polar solvent. In this case, when a first electrode connected to the wetted region of the hydrophilic fiber membrane and a second electrode connected to the dry region of the hydrophilic fiber membrane are connected by a circuit, a DC voltage, a DC current and power can be produced.

Furthermore, the electrical energy generation apparatus can continue to generate electrical energy because a potential caused by a capacitance difference between the first region and the second region can be continuously maintained. For example, in the hydrophilic fiber membrane coated with the conductive polymers, a large amount of cations (including hydrogen ions) move from conductive polymers and a hydrophilic fiber membrane (e.g., cotton fabric), cations and anions included in a polar solvent (fluid) move from the wetted region of cotton fabric to the dry region, and a flow of electrons for maintaining charge neutrality within the conductive polymers is caused. Accordingly, the present invention can continue to generate electrical energy of a DC form because a potential/current is continuously generated. The electrical energy generation apparatus based on the double layer proposed in the present invention may have various phenomena not appearing in the existing evaporation-driven streaming potential.

A flow of the existing evaporation-driven streaming potential is generated by the continuous evaporation of a fluid, and the potential is generated in the environment in which a flow of a fluid is maintained. The environment in which relative humidity is high, it is difficult for the existing evaporation-driven streaming potential to generate power because the evaporation speed is greatly reduced and a flow of a fluid is congested. In contrast, in the electrical energy generation apparatus based on the double layer according to an embodiment of the present invention, the generation of electrical energy is rarely influenced by humidity because fabric having an excellent water adsorption force provides a fast flow of a fluid.

Furthermore, a voltage according to the existing evaporation-driven streaming potential tends to decrease as a concentration of cations increases. In contrast, both of the voltage and current of electrical energy generated through the double layer of the present invention tends to increase as various types of ions are added. For example, in the existing evaporation-driven streaming potential, the speed at which a fluid flows is limited because a flow of the fluid depends on evaporation. Accordingly, since the amount of the fluid itself is limited, an increase in the concentration of cations included in the limited amount of the fluid leads to a decrease in the amount of evaporation of the fluid attributable to a reduction in vapor pressure. As a result, since a decrease in the amount of evaporation may congest a flow of a fluid, a voltage tends to decrease according to an increase in the concentration of cations in the existing evaporation-driven streaming potential. In contrast, the hydrophilic fiber membrane of the present invention can autonomously induce a flow of a fluid through the asymmetrical wetting of the polar solvent and also arrange various cations on the outer Helmholtz plane. Accordingly, an increase in the concentration may lead to a relatively greater potential. Accordingly, both a voltage and a current may increase according to an increase in the concentration of cations. Furthermore, in the pseudocapacitor conductive polymers, both cations and anions may be used to generate power because anions can be arranged on an inner Helmholtz plane very close to a surface of the pseudocapacitor conductive polymers.

At least one polymer material selected from poly(3,4-ethylenedioxythiophene) (PEDOT:PSS), polyaniline (PANI), polypyrrole (PPy), Poly(p-phenylene vinylene) (PPV), Poly(acetylene)s (PAC), and poly(p-phenylene sulfide) (PPS) may be used as the conductive polymer. The conductive polymer having an excellent electrical conductivity and electric double layer-oxidation/reduction complex adsorption characteristic and well bonded to the hydrophilic fiber membrane is not limited to a specific polymer material. A conductive polymer layer coated in a thin film form may be used and a 0-D, 1-D and 2-D conductive polymer layer may be solely used or composited and used.

Figure 20:
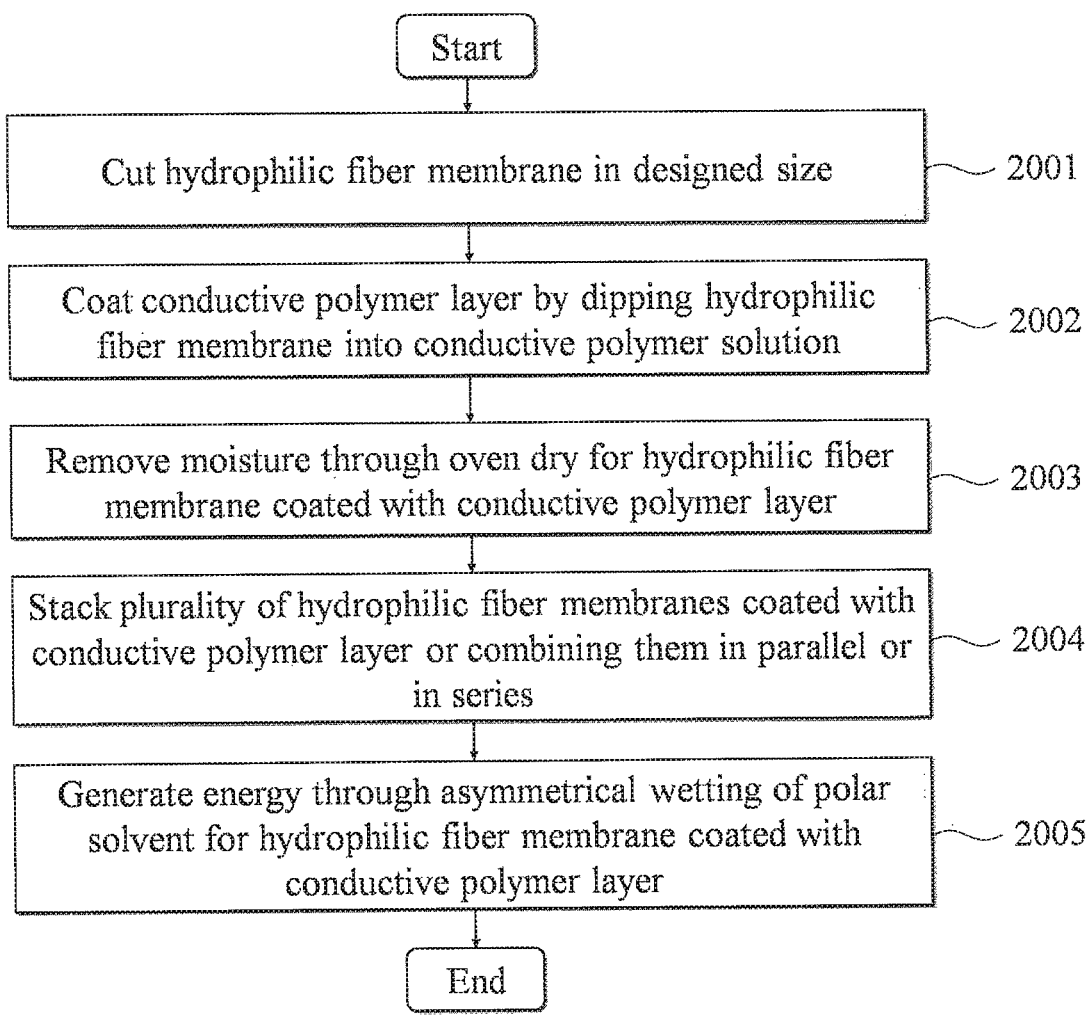
FIG. 20 is a flowchart illustrating a method of fabricating the electrical energy generation apparatus based on a hydrophilic fiber membrane coated with a conductive polymer layer using a dipping process according to an embodiment of the present invention.

FIG. 20 shows a flowchart according to a method of fabricating the electrical energy generation apparatus based on a hydrophilic fiber membrane coated with a conductive polymer layer using a dipping process according to an embodiment of the present invention. As may be seen from the flowchart of FIG. 20, the method of fabricating the electrical energy generation apparatus may include step 2001 of cutting a hydrophilic fiber membrane in a designed size, step 2002 of coating a conductive polymer layer by dipping the hydrophilic fiber membrane into a conductive polymer solution, and step 2003 of removing moisture through oven dry for the hydrophilic fiber membrane coated with the conductive polymer layer. Each electrical energy generation apparatus may be fabricated through step 2001 to step 2003. A plurality of the electrical energy generation apparatuses may be combined to fabricate a large-area electrical energy generation apparatus. In order to fabricate such a large-area electrical energy generation apparatus, the method of fabricating the electrical energy generation apparatus may further include step 2004 as shown in FIG. 20. Furthermore, in order to generate electrical energy through each electrical energy generation apparatus or the large-area electrical energy generation apparatus, the method of fabricating the electrical energy generation apparatus may further include step 2005 of generating electrical energy through the asymmetrical wetting of a polar solvent with respect to a hydrophilic membrane coated with the conductive polymer layer.

Step 2001 may be a process of cutting a hydrophilic fiber membrane, containing a polar solvent in some region because the hydrophilic fiber membrane becomes a frame of each electrical energy generation apparatus, in a preset size (e.g., 3 cm (length)×9 cm (breadth)). In this case, the thickness of the hydrophilic fiber membrane may be included in a range of 5 μm to 1 mm. Such a hydrophilic fiber membrane may include at least one material selected from cotton fabric, Korean mulberry paper, a polypropylene membrane, oxygen plasma-processed non-woven fabric, hydrophilic surface-processed textile, and nano fiber.

Step 2002 may be a process of coating the conductive polymer layer on the hydrophilic fiber membrane. To this end, as described in FIG. 19, the hydrophilic fiber membrane may be dipped into the conductive polymer solution in which the conductive polymers have been dispersed in water. For example, the conductive polymer material may be dispersed in water to have a mass ratio of 0.5~1 wt % in the water. As described above, the conductive polymer material forming the conductive polymer layer may include at least one polymer material selected from poly(3,4-ethylenedioxythiophene) (PEDOT:PSS), polyaniline (PANI), polypyrrole (PPy), Poly(p-phenylene vinylene) (PPV), Poly(acetylene)s (PAC), and poly(p-phenylene sulfide) (PPS). Such a conductive polymer layer may have an excellent electrical conductivity characteristic and electric double layer-oxidation/reduction complex adsorption complex absorption characteristic, and may be composited in a 0-D, 1-D or 2-D manner and bonded to the hydrophilic fiber membrane. The conductive polymer layer may be coated by loading the conductive polymers within a range of 2.1 mg/cm$^3$~0.024 mg/cm$^3$ per unit volume onto the hydrophilic fiber membrane. The voltage and current of generated electrical energy may be controlled through the amount of the loaded conductive polymers. For example, in order to control the amount of conductive polymers loaded onto the hydrophilic fiber membrane, the number of times that the hydrophilic fiber membrane is impregnated into the conductive polymer coating solution may be controlled and/or a mass ratio for water of the conductive polymers may be controlled.

Step 2003 may be a process of drying the hydrophilic fiber membrane coated with the conductive polymer layer. The reason for this is that as described above, electrical energy can be generated through a potential difference with the region wetted by the polar solvent only when the region other than the region in which the polar solvent is dropped must be a dry state. Accordingly, the hydrophilic fiber membrane coated with the conductive polymer layer may be basically used in the dried state. In this process, the hydrophilic fiber membrane coated with the conductive polymer layer may be placed on a flat tray and dried through the oven (e.g., 80° C.).

Step 2004 may be a process of stacking two or more hydrophilic fiber membranes coated with the conductive polymer layer or combining them in parallel or in series in order to fabricate a large-area electrical energy generation apparatus. The stacking between the electrical energy generation apparatuses may be used to increase the amount of generated current and to sustain the generation of electrical energy for a long time by effectively suppressing the evaporation of the polar solvent. Furthermore, to connect the electrical energy generation apparatuses in parallel or in series may be used to generate a large area-maximized current and voltage. In this case, the stacking between the electrical energy generation apparatuses may mean that the hydrophilic fiber membranes coated with the conductive polymer layers are physically stacked. In contrast, the parallel/series connection/coupling between the electrical energy generation apparatuses may mean electrical connection/coupling.

Step 2005 may be a process of asymmetrically dropping the polar solvent to the hydrophilic fiber membrane in order to generate electrical energy using the fabricated electrical energy generation apparatus. As already described above, when the polar solvent is dropped to only some part of the hydrophilic fiber membrane coated with the conductive polymer layer, the conductive polymers of the wetted region is adsorbed onto the polar solvent, and thus the wetted region and the dry region form opposite polarities, thereby generating electrical energy.

Additionally, polar protic solvent containing ions may be used as the polar solvent. For example, the polar solvent may include (1) a synthetic solution in which ions have been dissolved in at least one polar protic solvent of acid, n-butanol, isopropanol, n-propanol, ethanol, methanol and water and (2) a solution existing in nature, such as at least one of seawater and sweat. Methanol, formic acid, water, etc. may be used as the polar protic solvent containing hydrogen ions (proton) having a dielectric constant of 20 or more. In particular, when H$^+$, Li$^+$, Na$^+$ or K$^+$ ions are dissolved in water having the highest dielectric constant, the ions are additionally arranged on the outer Helmholtz plane, so the current and voltage of electrical energy are increased. Ions that are harmless to the human body and can improve performance of the electrical energy generation apparatus include Na$^+$, K$^+$, etc.

The fabricated electrical energy generation apparatus can be applied as a home energy assistant device, a portable power assistant device and the assistant power device of a wearable electronic device because it can generate DC power of high performance for a long time using only a small amount of polar protic solvent containing ions and can be mass-produced.

Figure 21:
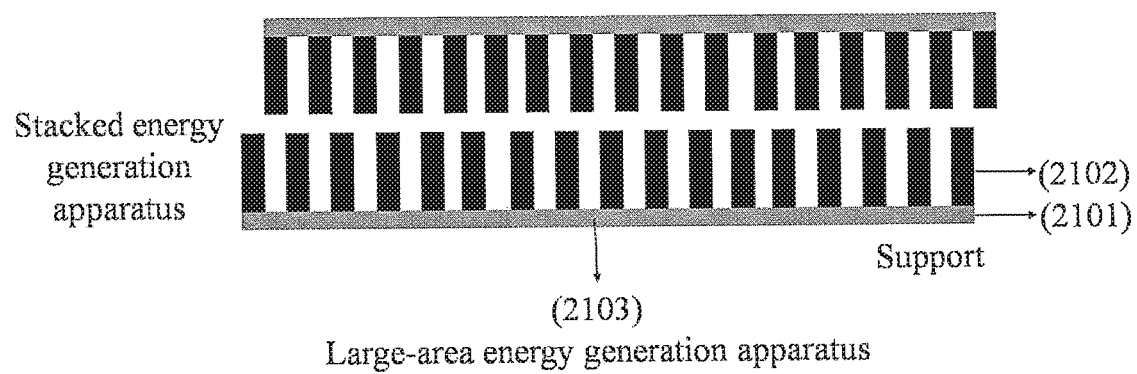
FIG. 21 is a diagram of a large-area electrical energy generation apparatus with which stacked electrical energy generation apparatuses have been coupled according to an embodiment of the present invention.

FIG. 21 is a diagram of a large-area electrical energy generation apparatus in which stacked electrical energy generation apparatuses have been combined according to an embodiment of the present invention. As described above, in order to drive a high-capacity electronic device using electrical energy generation apparatuses coated with the conductive polymers, it is necessary to fabricate a large-area electrical energy generation apparatus by stacking or connecting the electrical energy generation apparatuses in parallel/in series. FIG. 21 shows an electrical energy generation apparatus 2102 in which a plurality of the electrical energy generation apparatuses has been stacked according to an embodiment. FIG. 21 shows an embodiment for forming a large-area electrical energy generation apparatus 2103 in which a plurality of the stacked electrical energy generation apparatuses is disposed through the spaced provided by a support 2101 and electrically connected/coupled in series and/or in parallel. An electronic device that requires a high driving voltage and current can be driven using a polar solvent, such as a polar protic solvent containing a small amount of ions, through such a large-area electrical energy generation apparatus 2103.

The present invention is described in detail below through embodiments and comparative examples. The embodiments and comparative examples are intended to merely describe the present invention, and the present invention is not limited to the following examples.

COMPARATIVE EXAMPLE 2

Figure 22:
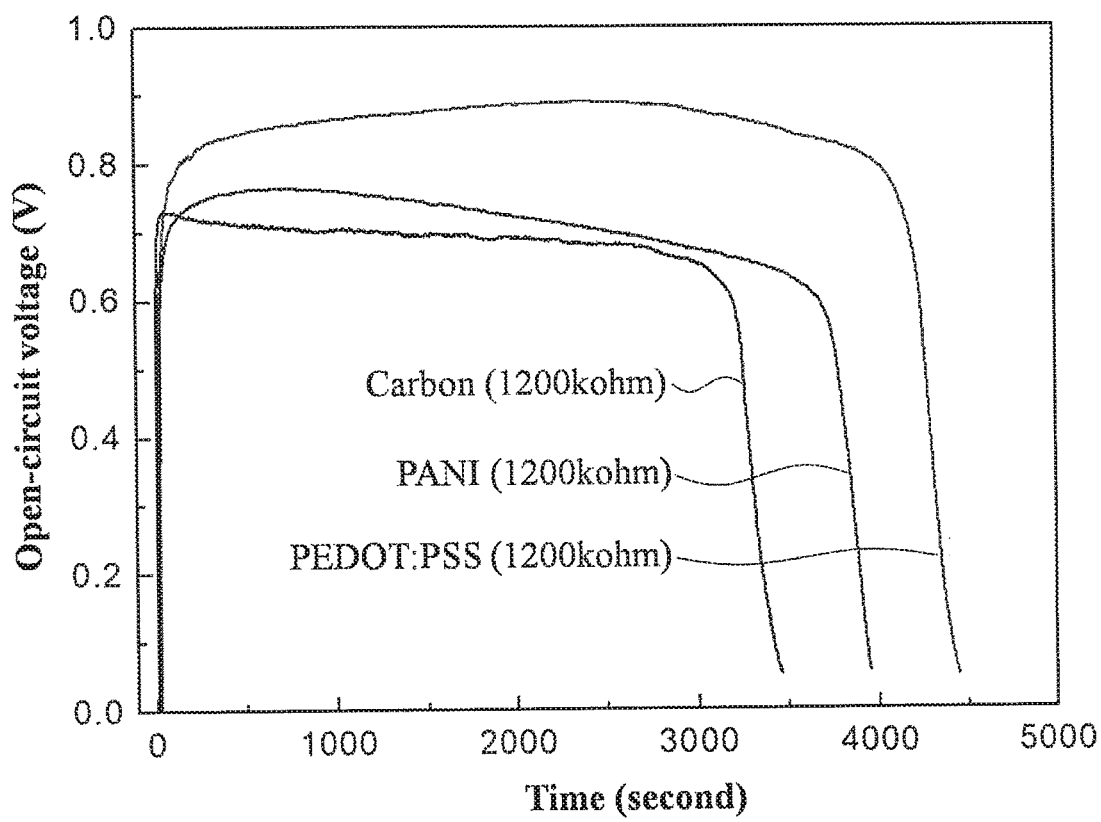
FIG. 22 shows the results of a comparison between open-circuit voltages generated after performing asymmetrical wetting on an electrical energy generation apparatus coated with carbon particles having the same resistance value according to a comparative example 2 and an electrical energy generation apparatus coated with PANI and PEDOT:PSS, that is, conductive polymers on a surface of which all of cation/anion are adsorbed.

Performance Comparison Between Electrical Energy Generation Apparatuses Coated with Materials Having Different Adsorption Characteristics FIG. 22 shows that the asymmetrical wetting of the polar protic solvent containing ions was performed on an electrical energy generation apparatus in which carbon particles having the same resistance were applied (or coated) on a hydrophilic fiber membrane (hereinafter referred to as a "first electrical energy generation apparatus") and on electrical energy generation apparatuses in which a conductive polymer PANI and a conductive polymer PEDOT:PSS capable of adsorbing both anions and cations onto their surfaces were respectively applied (or coated) on hydrophilic fiber membranes (hereinafter referred to as a "second electrical energy generation apparatus" and a "third electrical energy generation apparatus") and generated open-circuit voltages of electrical energy were compared. As a result, the second electrical energy generation apparatus and third electrical energy generation apparatus coated with the conductive polymers PANI and PEDOT:PSS had a higher open-circuit voltage than the first electrical energy generation apparatus coated with carbon particles. The third electrical energy generation apparatus coated with the conductive polymer PEDOT:PSS showed an open-circuit voltage of 30% or more compared to the first electrical energy generation apparatus. It could be seen that the third electrical energy generation apparatus coated with the conductive polymer. PEDOT:PSS is an example of a system capable of maximizing a generated voltage and current based on a result of the comparison.

Figure 23:
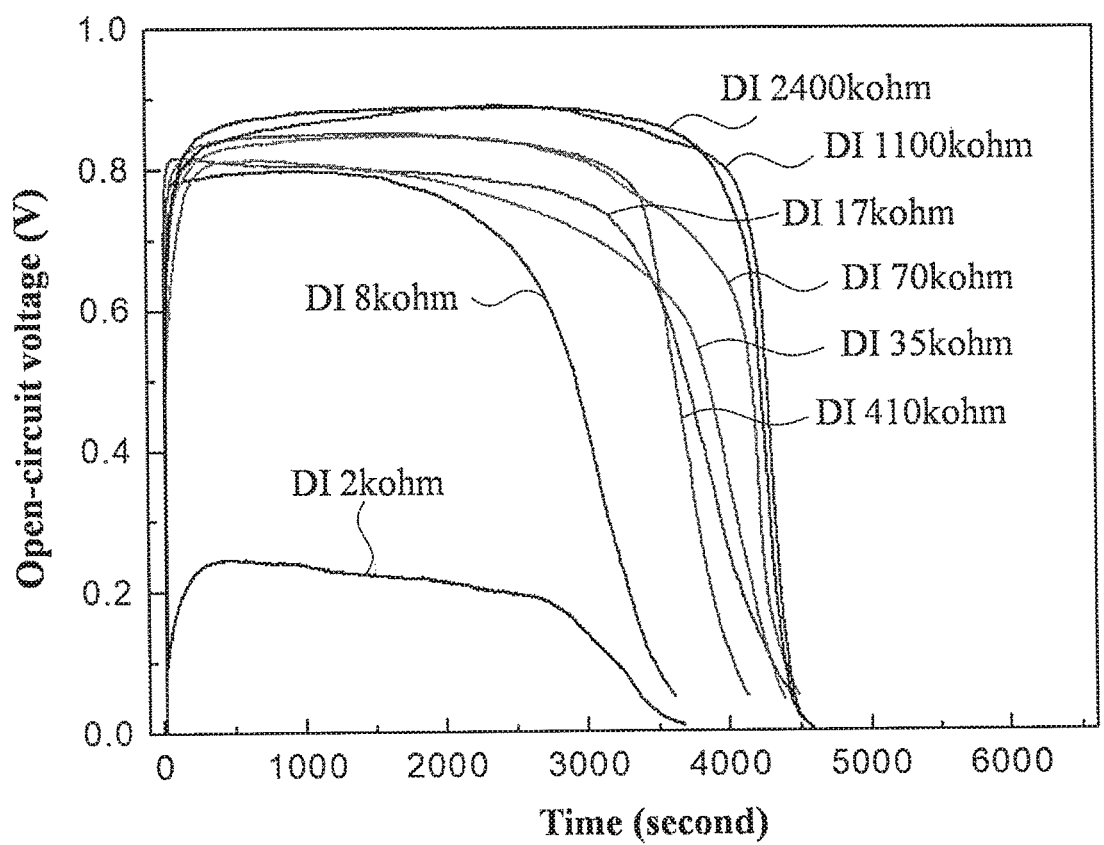
FIG. 23 shows the results of measurement of open-circuit voltages generated by asymmetrical wetting of water according to a change in resistance of a cotton fabric electrical energy generation apparatus coated with a conductive polymer PEDOT:PSS layer.

Embodiment 5: Fabrication of Electrical Energy Generation Apparatus Using PEDOT:PSS Dipping Process FIG. 23 shows the results of open-circuit voltages according to change in resistance of the cotton fabric electrical energy generation apparatus (third electrical energy generation apparatus described with reference to FIG. 22) coated with the conductive polymer PEDOT:PSS. The number of times that cotton fabric was impregnated into a solution in which PEDOT:PSS was dispersed was differently adjusted. As the number of impregnations increases, the amount of PEDOT:PSS loaded onto a surface also increases, so resistance is lowered. 8 electrical energy generation apparatuses having resistance of 2 kΩ, 8 kΩ, 17 kΩ, 35 kΩ, 70 kΩ, 410 kΩ, 1100 kΩ and 2400 kΩ, respectively, were prepared as samples. As can be seen from the open-circuit voltage graph of FIG. 23, as the resistance of the electrical energy generation apparatus increases, a high open-circuit voltage (2.4 MΩ sample: 0.87 V) characteristic appears. In the sample having the lowest resistance of 2 kΩ, a low open-circuit voltage characteristic of 0.24 V was monitored because PEDOT:PSS having hydrophobicity was thickly loaded. In order to obtain a high open-circuit voltage characteristic, it can be seen that it is important to control base resistance of the electrical energy generation apparatus based on the hydrophilic fiber membrane and the amount of loading of the conductive polymers having hydrophobicity.

Figure 24:
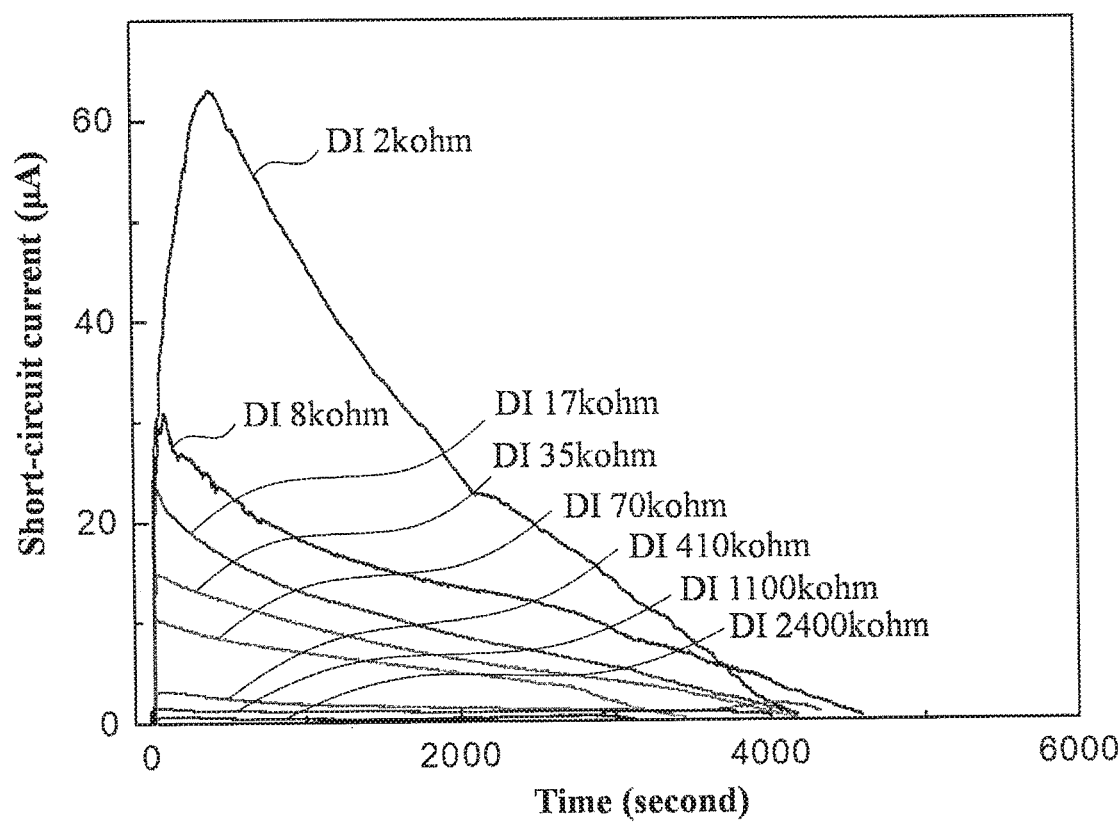
FIG. 24 shows the results of measurement of open short-circuit currents generated by asymmetrical wetting of water according to a change in the resistance of the cotton fabric electrical energy generation apparatus coated with a conductive polymer PEDOT:PSS layer.

FIG. 24 shows the results of short-circuit currents according to a change in resistance of the cotton fabric electrical energy generation apparatus coated with the conductive polymer PEDOT:PSS layer. As in the results of FIG. 23, generated short-circuit currents of samples having a resistance distribution of 2 kΩ, 8 kΩ, 17 kΩ, 35 kΩ, 70 kΩ, 410 kΩ, 1100 kΩ and 2400 kΩ, respectively, were measured. As can be seen from the short-circuit current graph of FIG. 24, as resistance of the electrical energy generation apparatus is lowered, a high short-circuit current (2 kΩ sample: ~60 μA) characteristic appears. In the sample having the highest resistance of 2.4 MΩ, a low short-circuit current characteristic of 1 μA or less was monitored. It can be seen that the base resistance of the electrical energy generation apparatus based on the hydrophilic fiber membrane has a direct influence on a generated current.

Figure 25:
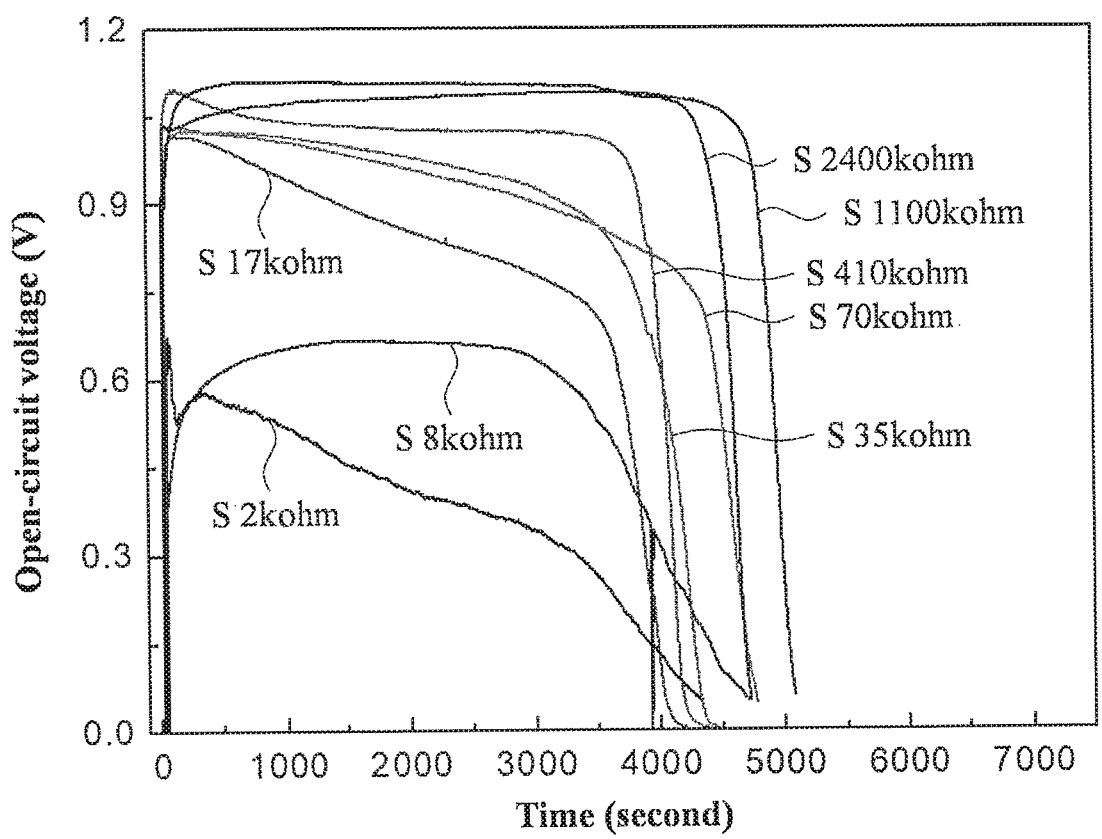
FIG. 25 shows the results of measurement of open-circuit voltages generated using artificial sweat, that is, a liquid containing representative salt generated from the human body, in the cotton fabric electrical energy generation apparatus coated with a conductive polymer PEDOT:PSS layer.

Embodiment 6: Generation of Voltage of Electrical Energy Generation Apparatus Coated With Conductive Polymers Using Artificial Sweat Containing Salt FIG. 25 shows the results of measurement of open-circuit voltages of samples having the same resistance change as that of FIG. 24 in order to confirm the possibility that sweat, that is, a liquid containing representative salt generated from the human body, can be used for a cotton fabric electrical energy generation apparatus coated with the conductive polymer PEDOT:PSS layer as a polar solvent. Artificial sweat was configured in the mass ratio of NaCl 0.6%, KCl 0.1%, and $CaCl_2$ 0.1% and dissolved. Asymmetrical wetting was performed on one pole of the electrical energy generation apparatus using the same method as that of FIGS. 23 and 44. A maximum open-circuit voltage appeared in the sample of 2.4 MΩ and was close to a maximum of 1.1 V. It could be seen that artificial sweat was about 30% higher than pure water. This means that when the cotton fabric electrical energy generation apparatus is used as an energy supplier capable of being attached to the human body, sweat generated from the human body can be naturally used as an energy supply source.

Figure 26:
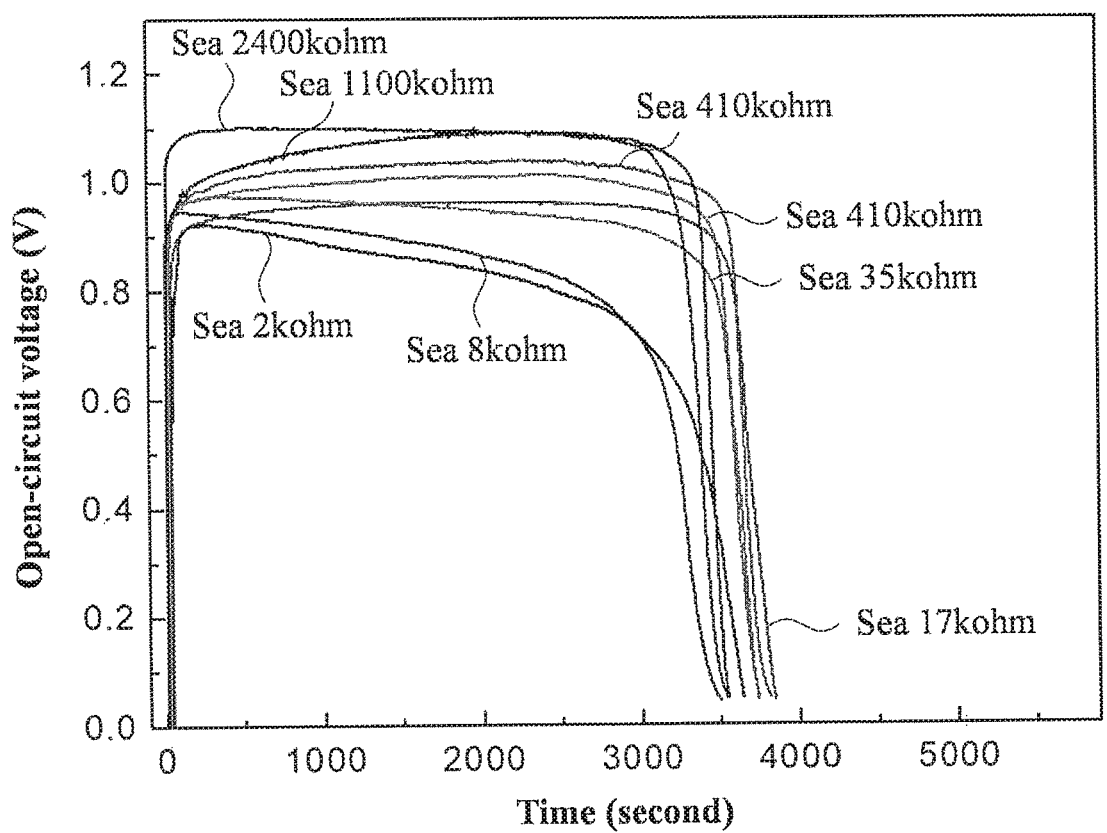
FIG. 26 shows the results of measurement of open-circuit voltages generated using artificial seawater, that is, a liquid containing representative salt and sufficiently present on the earth, in the cotton fabric electrical energy generation apparatus coated with a conductive polymer PEDOT:PSS layer.

Embodiment 7: Generation of Voltage of Electrical Energy Generation Apparatus Coated With Conductive Polymers Using Artificial Seawater Containing Salt FIG. 26 shows the results of measurement of open-circuit voltages of samples having the same resistance change as that of FIG. 24 in order to confirm the possibility that seawater, that is, a liquid containing representative salt and abundantly existing on the earth, can be used in a cotton fabric electrical energy generation apparatus coated with the conductive polymer PEDOT:PSS layer as a polar solvent. Salts, such as NaCl of 1.08 g, $MgCl_2$ of 0.15 g, $MgSO_4$ of 0.07 g, and $KSO_4$ of 0.05 g, were dissolved in the artificial seawater based on pure water of 40 ml with reference to the configuration of actual seawater. Asymmetrical wetting was performed on one pole of the electrical energy generation apparatus using the same method as that of FIGS. 23, 24 and 25. It can be seen that a maximum open-circuit voltage appears in the sample of 2.4 MΩ and has an improved open-circuit voltage of 30% close to a maximum of 1.1 V. This means that if the cotton fabric electrical energy generation apparatus is extended to a 3-D energy storage system of a floating matter form fabricated as a large area, it can be used as an electrical energy generation apparatus for generating high-capacity power using seawater in an electronic device of a floating matter form in the sea.

Figure 27:
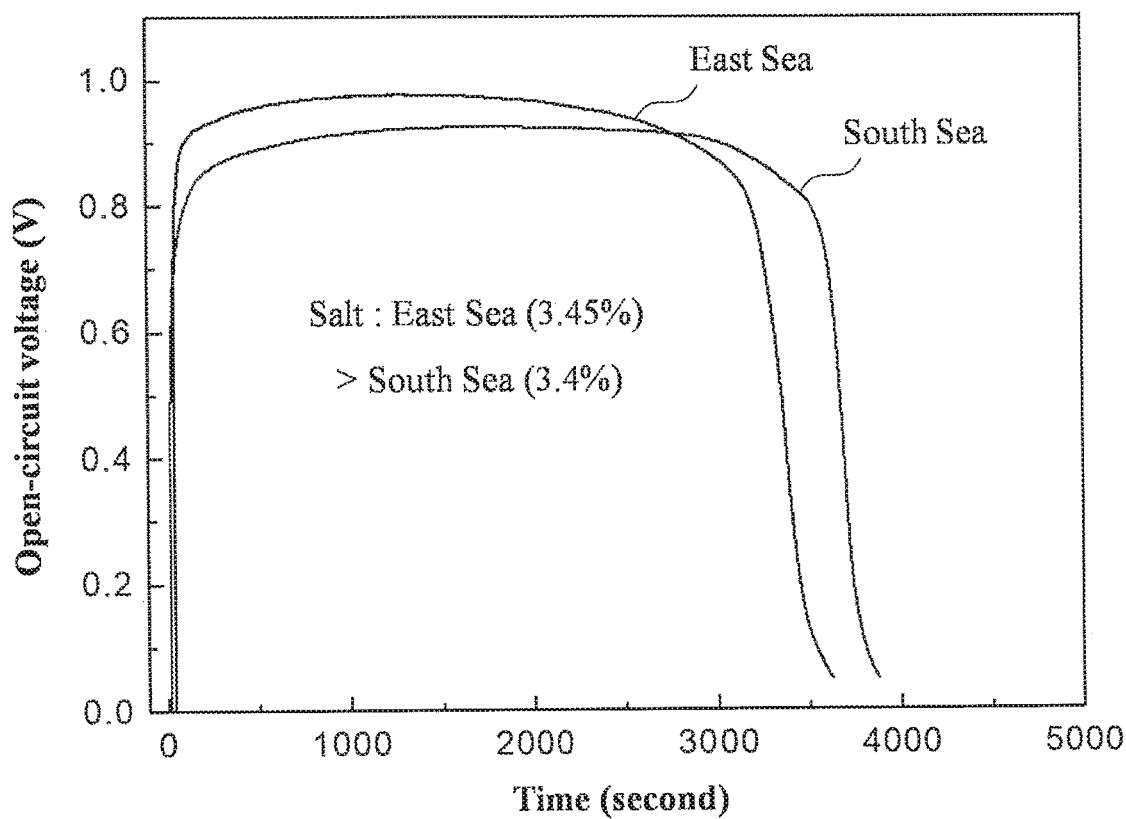
FIG. 27 shows the results of confirmation of voltage behaviors differently appearing using actual the seawater of the East Sea and the South Sea in the cotton fabric electrical energy generation apparatus coated with a conductive polymer PEDOT:PSS layer.

FIG. 27 shows voltage behaviors differently appearing when the seawater of the East Sea and the seawater of the South Sea were actually used in the cotton fabric electrical energy generation apparatus coated with the conductive polymer PEDOT:PSS layer. Asymmetrical wetting was performed based on the electrical energy generation apparatus on which conductive polymers of 35 kΩ were identically loaded. Generated open-circuit voltages were measured. It can be seen that an electrical energy generation apparatus in which the seawater of the East Sea was dropped to some region has a generated open-circuit voltage about 10% higher than that of an electrical energy generation apparatus in which the seawater of the South Sea was dropped to some region. The reason for this is that the content of salt (3.45%) in the East Sea is higher than the content of salt (3.4%) in the South Sea. A generated voltage and current of the electrical energy generation apparatus was influenced by the content of salt. This means that the electrical energy generation apparatus can also be used as a system capable of detecting a difference between salts. In particular, this is of great significance in that seawater that can be easily obtained everywhere in the world can be applied to a membrane coated with conductive polymers.

As described above, in the electrical energy generation apparatus based on a hydrophilic fiber membrane coated with a conductive polymer layer, the conductive polymer layer is formed by uniformly coating conductive polymers on a surface of the fiber strands of the hydrophilic fiber membrane through a dipping process. The hydrophilic fiber membrane having a high adsorption force for a polar solvent (preferably, a polar solvent containing ions) may generate a potential, caused by capacitance generated the adsorption of cations and anions between the polar solvent and the conductive polymer layer, for a long time. In particular, DC electrical energy can be generated and maintained for 1 hour or more by only maintaining the asymmetrical wetting of the electrical energy generation apparatus based on the hydrophilic fiber membrane coated with the conductive polymer layer using a small amount (0.25 ml) of polar protic solvent containing ions. A generated voltage and current can be maximized by stacking a plurality of such high-performance electrical energy generation apparatuses or combining them in series or in parallel to form a large area. Power of a DC form generated as described above can drive an IoT-based electronic device having high driving power without separate rectifier circuit or energy storage device, or it may be stored in an energy storage system and used to drive an electronic device that requires high power. Furthermore, sweat or seawater may be used as a polar solvent. This means that the electrical energy generation apparatuses according to the embodiments of the present invention may be used to produce power for a wearable device or a structure in the sea.

In accordance with the embodiments of the present invention, an electrical energy generation apparatus capable of producing DC power can be fabricated by a behavior of simply dropping water (polar solvent) to the hydrophilic fiber membrane coated with the carbon layer.

The hydrophilic fiber membrane electrical energy generation apparatus coated with the carbon layer (carbon layer-hydrophilic fiber membrane complex generator) fabricated using a dipping process is an eco-friendly electrical energy generation apparatus for generating high-efficiency DC power based on strong polar solvent adsorption performance with a high surface area of the carbon layer, excellent wetting and porosity of the hydrophilic fiber membrane, and high content of cations. In particular, the hydrophilic fiber membrane coated with a carbon layer and having a standard of 3 cm (length)×9 cm (breadth) can generate DC power for 1 hour or more using a small amount of water of 0.5 ml or less and can be mass-produced. Accordingly, the hydrophilic fiber membrane has a good possibility that it can be used as a home energy assistant device, a portable power assistant device and the assistant power device of a wearable electronic device.

In accordance with embodiments the present invention, an electrical energy generation apparatus for generating high-performance DC power can be fabricated by a behavior of dropping a polar solvent (preferably, polar protic solvent containing ions) to the hydrophilic fiber membrane coated with the conductive polymer layer.

Conductive polymers are uniformly coated on a surface of the fiber strands of the hydrophilic fiber membrane capable of easily adsorbing the polar solvent through a dipping process, and electrical energy can be generated by only the presence of the polar solvent. Furthermore, a generated voltage and current can be increased by providing a large-area electrical energy generation apparatus in which a plurality of the electrical energy generation apparatuses based or the fiber membrane has been combined. Accordingly, electrical energy for driving a high-power electronic device can be generated.

For example, the electrical energy generation apparatus based on the hydrophilic fiber membrane coated with the conductive polymer layer, fabricated using a dipping process, can generate high-efficiency DC power based on the conductive polymer, that is, a representative pseudocapacitor material capable of adsorbing both cations and anions, and the excellent wetting and porosity of the hydrophilic fiber membrane. In an embodiment, the hydrophilic fiber membrane coated with the conductive polymer layer having a size of 3 cm (length)×9 cm (breadth) can generate DC power for 1 hour or more using a small amount of water of 0.25 ml or less and can be mass-produced. Accordingly, the hydrophilic fiber membrane has a good possibility that it can be used as a home energy assistant device, a portable power assistant device and the assistant power device of a wearable electronic device.

The above description is merely a description of the technical spirit of the present invention, and those skilled in the art may change and modify the present invention in various ways without departing from the essential characteristic of the present invention. Accordingly, the embodiments disclosed in the present invention should not be construed as limiting the technical spirit of the present invention, but should be construed as illustrating the technical spirit of the present invention. The scope of the technical spirit of the present invention is not restricted by the embodiments, and the range of protection of the present invention should be interpreted based on the following appended claims. Accordingly, the range of protection of the present invention should be construed based on the following claims, and a full technological spirit within an equivalent range thereof should be construed as being included in the scope of right of the present invention.

What is claimed is:

1. A complex generator, comprising:
   a hydrophilic fiber membrane having a surface uniformly coated with an adsorption material,
   a first electrode connected to a first end of the hydrophilic fiber membrane; and
   a second electrode connected to a second end of the hydrophilic fiber membrane,
   wherein electrical energy is generated in such a manner that the adsorption material is adsorbed onto a polar solvent in some region of the uniformly coated surface of the hydrophilic fiber membrane by asymmetrical wetting of the polar solvent for the uniformly coated surface of the hydrophilic fiber membrane, and
   wherein the first electrode and the second electrode are configured to be coupled to a component such that the electrical energy is provided to the component.

2. The complex generator of claim 1, wherein the wetting of the polar solvent for the uniformly coated surface of the hydrophilic fiber membrane forms an electric double layer on a surface of the adsorption material, such that a voltage difference induced by a capacitance difference occurs between a wetted region and a dry region to generate electrical energy.

3. The complex generator of claim 1, wherein a current is generated based on a continuous flow of electrons caused when cations of the polar solvent included in the hydrophilic fiber membrane flows.

4. The complex generator of claim 3, wherein the electrical energy is generated by the current generated when hydrogen ions (proton) included in the polar solvent as the cations move from a wetted region of the uniformly coated surface of the hydrophilic fiber membrane to a dry region of the uniformly coated surface of the hydrophilic fiber membrane and electrons included in the adsorption material move in a direction identical with the movement of the hydrogen ions or holes included in the adsorption material moves in a direction opposite the movement of the hydrogen ions in order to maintain charge neutrality.

5. The complex generator of claim 3, wherein:
the adsorption material comprises conductive polymers, and
when the cations move from a wetted region of the uniformly coated surface of the hydrophilic fiber membrane to a dry region of the uniformly coated surface of the hydrophilic fiber membrane, electrons included in the conductive polymers flow in a direction identical with the movement of the cations in order to maintain charge neutrality.

6. The complex generator of claim 3, wherein:
the polar solvent comprises a polar protic solvent containing ions, and
cations included in the polar protic solvent move in a direction from a wetted region to a dry region.

7. The complex generator of claim 1, wherein the asymmetrical wetting comprises wetting between 0.01% and 99.9% of a total volume of the hydrophilic fiber membrane.

8. The complex generator of claim 1, wherein the polar solvent comprises (1) one solvent of acetic acid, water, ethanol, acetone, acetonitrile, methanol, isopropanol, ammonia and pyridine or a mixed solvent of two or more of them, (2) a synthetic solution in which ions have been dissolved in at least one polar protic solvent of formic acid, n-butanol, isopropanol, n-propanol, ethanol, methanol and water, or (3) a solution existing in nature like at least one of seawater and sweat.

9. The complex generator of claim 1, wherein the adsorption material comprises (1) a conductive carbon layer comprising at least one of carbon particles selected from super-P, Denka black, acetylene black and Ketjen black, activated carbon, graphene, and carbon nanotubes or (2) at least one conductive polymer selected from poly(3,4-ethylenedioxythiophene) polystyrene sulfonate (PEDOT:PSS), polyaniline (PAM), polypyrrole (PPy), Poly(p-phenylene vinylene) (PPV), Poly(acetylene)s (PAC) and poly(p-phenylene sulfide) (PPS).

10. The complex generator of claim 1, wherein:
the adsorption material comprises a conductive polymer layer characterized in that cations and anions are simultaneously adsorbed onto the conductive polymer layer, composited in a 0-dimension, 1-dimension or 2-dimension, and coated by loading conductive polymers onto the surface of the hydrophilic fiber membrane in a range of 2.1 mg/cm$^3$~0.024 mg/cm$^3$ per unit volume, and
a voltage and current of the generated electrical energy are controlled through an amount of the loaded conductive polymers.

11. The complex generator of claim 1, wherein:
the adsorption material comprises a carbon layer in which carbon has been loaded onto the surface of the hydrophilic fiber membrane in a range of 0.9 mg/cm$^3$~0.007 mg/cm$^3$ per unit volume, and
an amount and power of the electrical energy is adjustable through control of a generated current by changing resistance of the hydrophilic fiber membrane through control of an amount of the carbon.

12. The complex generator of claim 1, wherein the hydrophilic fiber membrane comprises at least one material selected from cotton fabric, Korean mulberry paper, a polypropylene membrane, oxygen plasma-processed non-woven fabric, hydrophilic surface-processed textile and nano fiber.

13. The complex generator of claim 1, wherein:
the hydrophilic fiber membrane comprises hydrophilic fiber strands in order to improve a specific surface area of the surface and an adsorption force for the polar solvent, and
the adsorption material is bound and coated to a surface of each fiber strand.

14. The complex generator of claim 1, wherein a diameter of a fiber strand forming the hydrophilic fiber membrane is included in a range of 50 nm to 500 μm.

15. The complex generator of claim 1, wherein a thickness of the hydrophilic fiber membrane is included in a range of 5 μm to 1 mm.

16. The complex generator of claim 1, wherein a breadth and length aspect ratio of the hydrophilic fiber membrane is 1 or more.

17. The complex generator of claim 1, wherein in order to increase a density and generation time of the electrical energy, at least one of an amount, voltage and power density of the electrical energy and an adsorption force for the polar solvent is adjusted by stacking a plurality of the hydrophilic fiber membranes coated with the adsorption material or connecting the hydrophilic fiber membranes in parallel or in series.

* * * * *